United States Patent
Flammer, III

(10) Patent No.: US 10,897,763 B2
(45) Date of Patent: Jan. 19, 2021

(54) TECHNIQUES FOR MANAGING HETEROGENOUS NODES CONFIGURED TO SUPPORT A HOMOGENEOUS COMMUNICATION PROTOCOL

(71) Applicant: Silver Spring Networks, Inc., Redwood City, CA (US)

(72) Inventor: George H. Flammer, III, Cupertino, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 103 days.

(21) Appl. No.: 15/009,711

(22) Filed: Jan. 28, 2016

(65) Prior Publication Data

US 2016/0226747 A1    Aug. 4, 2016

Related U.S. Application Data

(60) Provisional application No. 62/110,383, filed on Jan. 30, 2015.

(51) Int. Cl.
*H04W 8/00* (2009.01)
*H04W 72/04* (2009.01)
(Continued)

(52) U.S. Cl.
CPC ....... *H04W 72/0453* (2013.01); *H04W 8/005* (2013.01); *H04W 24/08* (2013.01);
(Continued)

(58) Field of Classification Search
CPC . H04W 72/0453; H04W 24/08; H04W 40/24; H04W 8/005
See application file for complete search history.

(56) References Cited

U.S. PATENT DOCUMENTS 6,487,167 B1 * 11/2002 Shaio ................. H04L 45/02
370/392
2005/0050225 A1    3/2005 Tatman
(Continued)

FOREIGN PATENT DOCUMENTS

EP    2461547 A1    6/2012

OTHER PUBLICATIONS

InGenu, "Dedicated Machine Connectivity for IoT", Found at: http://www.onrampwireless.com, 9 pages.
(Continued)

*Primary Examiner* — Michael Thier
*Assistant Examiner* — Brian P Cox
(74) *Attorney, Agent, or Firm* — Artegis Law Group, LLP

(57) ABSTRACT

A wireless mesh network includes heterogeneous types of nodes, including continuously-powered nodes and battery-powered nodes. The battery-powered nodes may reside in a sleeping state most of the time to conserve power. The various nodes in the network may communicate with one another by transmitting and receiving at scheduled times and on scheduled frequencies. The battery-powered nodes may become active during the scheduled transmit and receive times. Network management nodes may facilitate network formation by transmitting information that reflects the scheduled transmit and receive times across the network. Based on this data, the continuously-powered nodes and battery-powered nodes may establish communication links with one another.

21 Claims, 20 Drawing Sheets

(51) Int. Cl.
  *H04W 40/24* (2009.01)
  *H04W 40/00* (2009.01)
  *H04W 24/08* (2009.01)
(52) U.S. Cl.
  CPC ........... *H04W 40/00* (2013.01); *H04W 40/24* (2013.01); *Y02D 30/70* (2020.08)

(56) References Cited

U.S. PATENT DOCUMENTS

| | | |
|---|---|---|
| 2007/0214254 A1 | 9/2007 | Aguinik |
| 2009/0154343 A1 | 6/2009 | Fitch |
| 2009/0216100 A1 | 8/2009 | Ebner et al. |
| 2010/0029230 A1* | 2/2010 | Linsky ............... H04L 7/10 455/130 |
| 2011/0082941 A1* | 4/2011 | Kim ................. H04L 12/2859 709/227 |
| 2011/0205949 A1 | 8/2011 | Maenpaa |
| 2011/0274020 A1 | 11/2011 | Filoso |
| 2011/0277029 A1* | 11/2011 | Natarajan ........... H04L 61/256 726/15 |
| 2012/0106416 A1 | 5/2012 | Zheng et al. |
| 2012/0320790 A1* | 12/2012 | Shaffer .............. H04W 40/246 370/254 |
| 2013/0159567 A1* | 6/2013 | Gallagher ............ G06F 1/3234 710/52 |
| 2014/0101324 A1* | 4/2014 | Young ............... H04L 63/0272 709/228 |
| 2014/0115186 A1* | 4/2014 | Weston ............... H04L 69/163 709/235 |
| 2014/0269555 A1* | 9/2014 | Sadasivam ........ H04W 72/0406 370/329 |
| 2014/0286192 A1 | 9/2014 | Wei |
| 2015/0020169 A1 | 1/2015 | Mori |
| 2015/0071150 A1* | 3/2015 | Bradley ............ H04W 52/0216 370/311 |
| 2015/0296446 A1 | 10/2015 | Fischer |
| 2015/0327260 A1 | 11/2015 | Hui et al. |
| 2016/0192273 A1* | 6/2016 | Oren .................. H04W 40/244 370/329 |

OTHER PUBLICATIONS

SIGFOX, "We Power the IoT with the simplest Communication Solutions", The Global Communications Service Provider for the Internet of Things (IoT), Found at: http://www.sigfox.com, 6 Pages.
Sensus, "Focused on Your Corner of the World", Found at: http://sensus.com/regions/north-america/, 4 pages.
"AI is taking over San Francisco in" Found at: https://gigaom.com/2010/04/14/ericsson-sees-the-internet-of-things-by-2020/, 6 pages.
Wikipedia, "Source Routing", Found at: http://en.wikipedia.org/wiki/Source_routing, 2 pages, last modified Oct. 19, 2016.
Wikipedia, "Dijkstra's Algorithhm", found at: https://en.wikipedia.org/wiki/Dijkstra%27s_algorithm, 11 pages.
"Battery Energy Storage in Various Battery Sizes", Found at: http://www.allaboutbatteries.com/Energy-tables.html, 3 pages.
Tadiran, "TLM Series Lithium Metal Oxide Batteries", Found at: http://www.tadiranbat.com/index.php/high-power-tadiran-lithium-batteries, 2 pages.
Wikipedia, "Jenkins hash function", Found at: https://en.wikipedia.org/wiki/Jenkins_hash_function, 3 pages.
Vick J et al: "Wireless sensor network survey". Computer Networks. Elsevier Science Publishers B.V. Amsterdam, NL, vol. 52, No. 12. Aug. 22, 2008 (Aug. 22, 2008), pp. 2292-2330, XP022825257. ISSN: 1389-1286. DOI: 10.1016/J . COMNET . Apr. 2, 2008 [retrieved on Apr. 14, 2008] p. 2294. section "3. Types of sensor networks" p. 2303, section 11 6. Network services"p. 2309. section 11 7. Communication protocol".
International Search Report for Application No. PCT/US2016/015802, dated Jul. 6, 2016, 20 pages.
Non-Final Office Action for U.S. Appl. No. 15/009,715, dated Oct. 19, 2017, 27 pages.
Non-Final Office Action having U.S. Appl. No. 15/009,715, dated Oct. 30, 2018.
Final Office Action for U.S. Appl. No. 15/009,715, dated Feb. 10, 2020, 39 pages.

* cited by examiner

TRANSMIT PARAMETERS
750

- GEAR DATA
- CHANNEL DATA
- RECEIVE BANDWIDTH
- ZERO CHANNEL
- PREAMBLE LENGTH
- RECEIVE WINDOW
- RECEIVE SCHEDULE
- DUTY CYCLE
- ACK WAIT TIME
- BEACON SCHEDULE

FIG. 8

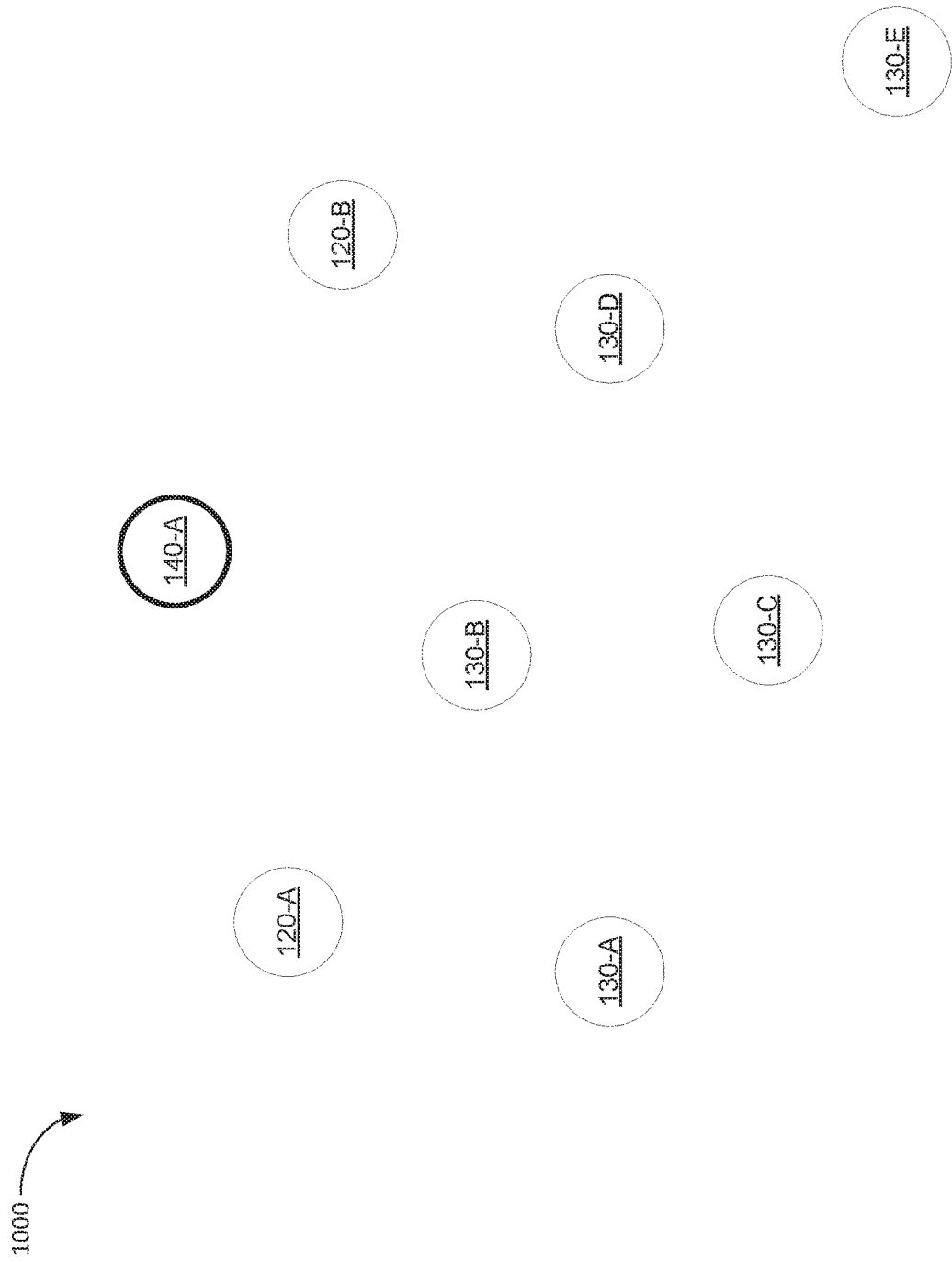

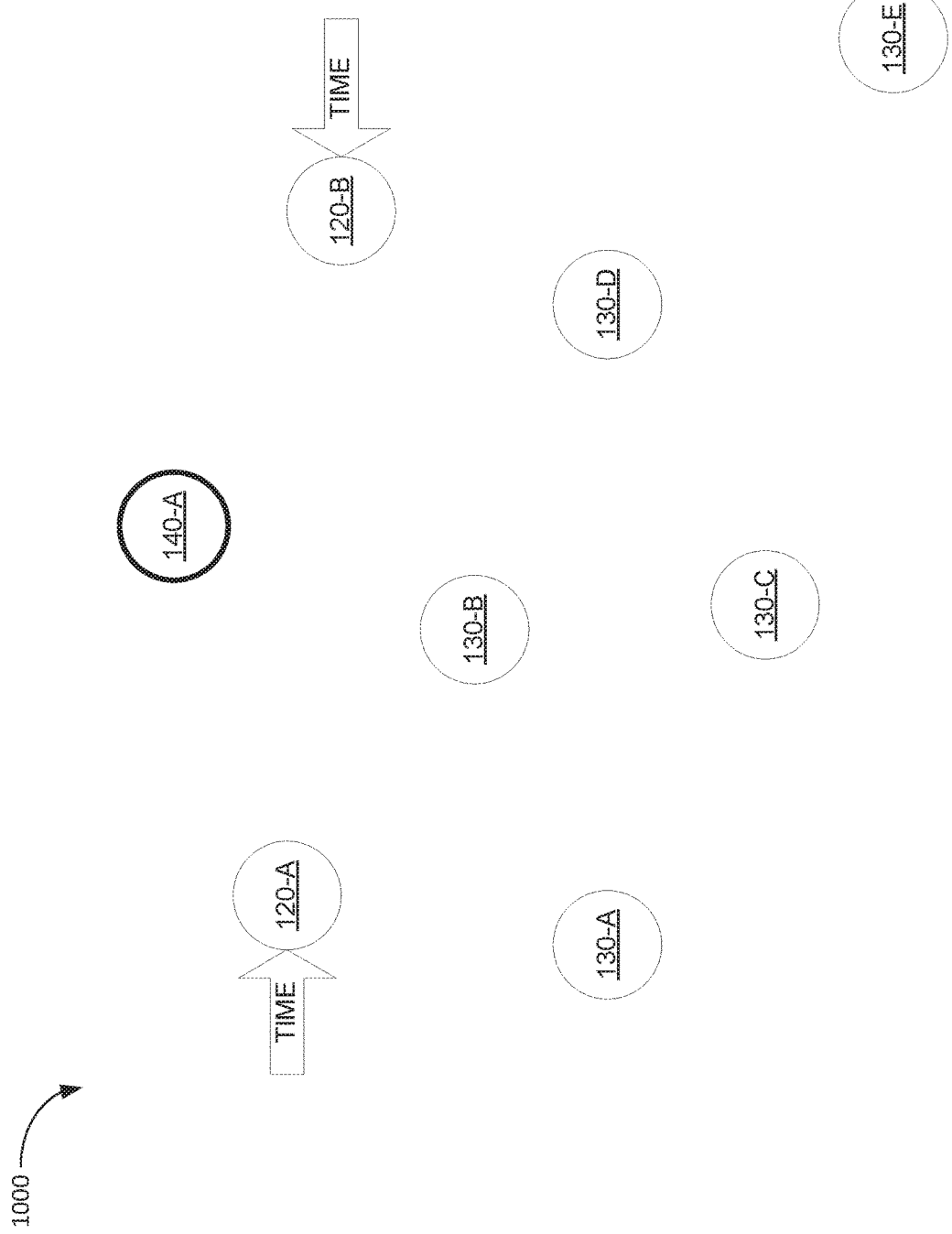

TECHNIQUES FOR MANAGING HETEROGENOUS NODES CONFIGURED TO SUPPORT A HOMOGENEOUS COMMUNICATION PROTOCOL

CROSS-REFERENCE TO RELATED APPLICATIONS

This application claims the benefit of U.S. provisional patent application titled "Techniques for Managing Heterogeneous Nodes Configured to Support a Homogeneous Communication Protocol," filed on Jan. 30, 2015 and having Ser. No. 62/110,383. The subject matter of this related application is hereby incorporated herein by reference.

BACKGROUND OF THE INVENTION

Field of the Invention

Embodiments of the present invention relate generally to wireless network communications and, more specifically, to techniques for managing heterogeneous nodes configured to support a homogeneous communication protocol.

Description of the Related Art

A conventional network includes a plurality of nodes configured to communicate with one another across various communication links. In a first type of network, nodes within the network draw power from an electricity grid in order to perform various operations, such as communication operations and data processing operations. In a second type of network, nodes within the network draw power from batteries to support communication and data processing operations.

Continuously-powered nodes and battery-powered nodes generally rely on different communication protocols, because continuously-powered nodes and battery-powered nodes have different resource limitations. In particular, battery-powered nodes typically communicate via protocols that conserve power, while continuously-powered nodes typically do not. Consequently, continuously-powered nodes cannot communicate with battery-powered nodes, and so conventional networks usually do not include both continuously-powered nodes and battery-powered nodes. Generally, different types of nodes do not employ similar communication protocols, and, therefore, networks typically do not include heterogeneous types of nodes. Such constraints place a substantial obstacle on the growing "Internet of Things" (IoT). Specifically, the IoT is meant to interconnect "things," such as nodes, of all different types. However, as set forth above, communication barriers impede the ability to interconnect heterogeneous nodes, such as continuously-powered nodes and battery-powered nodes. Such impediments jeopardize the ability of the IoT to continue growing.

As the foregoing illustrates, what is needed in the art is a technique for managing communication between different types of nodes that reside within a network.

SUMMARY OF THE INVENTION

One embodiment of the present invention sets forth a computer-implemented method for establishing a communication link between different network portions to generate a wireless mesh network, including identifying a first node within a first network portion, identifying a second node within a second network portion, where the first network portion and the second network portion include separate and distinct nodes, obtaining first network data that is associated with the first network portion and includes connectivity information related to the nodes included in the first network portion, and transmitting the first network data to the second node to enable the second node to communicate with the first node based on the first network data.

At least one advantage of the techniques described herein is that heterogeneous types of nodes, such as continuously-powered nodes and battery-powered nodes, may reside within the same wireless mesh network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates a set of transmit parameters according to which a node transmits data within the network system of FIG. 1, according to one embodiment of the present invention;

FIGS. 10A-10E are conceptual diagrams illustrating the formation of the wireless mesh network of FIG. 1, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
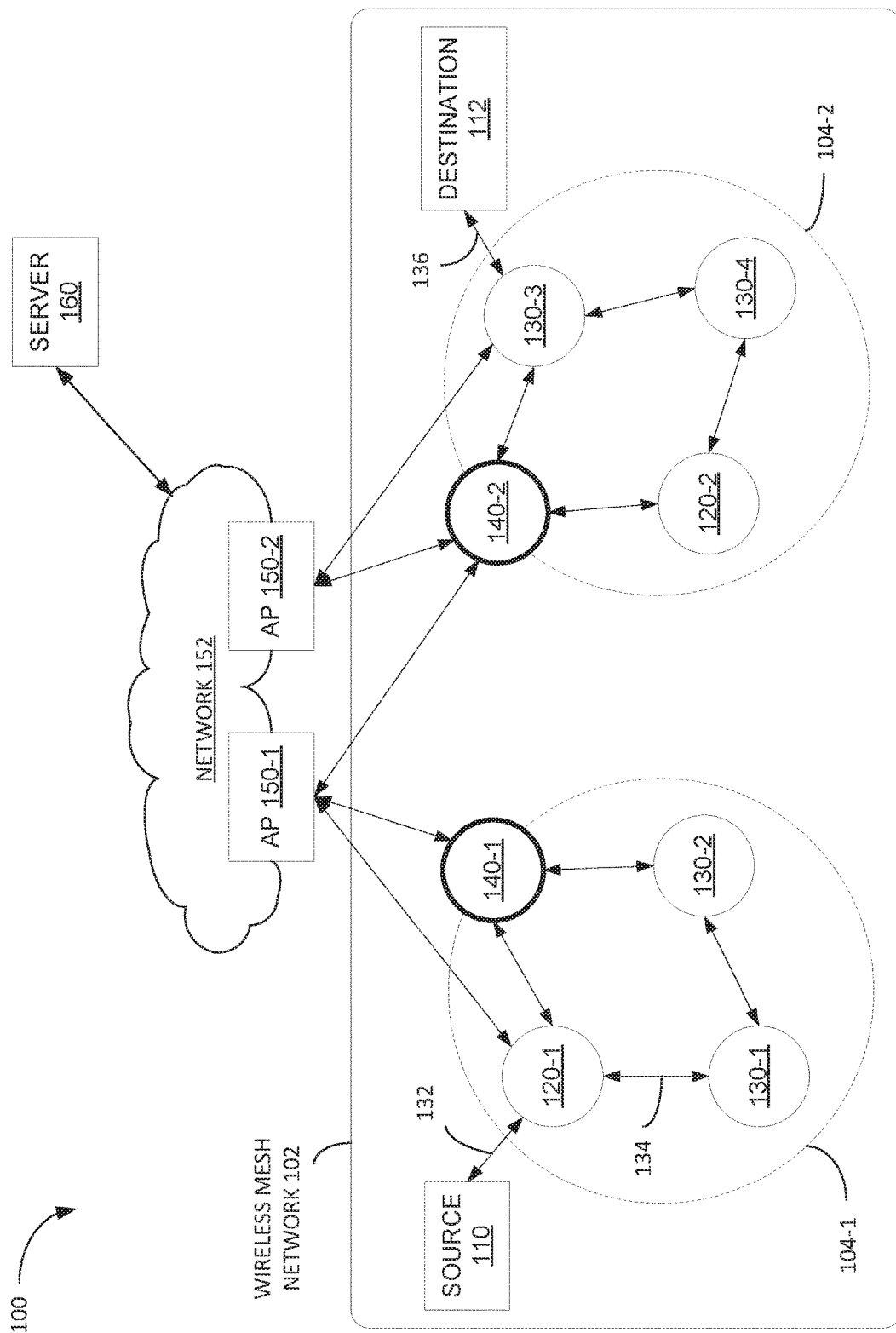
FIG. 1 illustrates a network system configured to implement one or more aspects of the present invention.

FIG. 1 illustrates a network system 100 configured to implement one or more aspects of the present invention. As shown, network system 100 includes a wireless mesh network 102, which may include a source node 110, nodes 120, 130, and 140, and destination node 112. Nodes 120 represent continuously-powered nodes that are coupled to a power grid. Nodes 130 represent battery-powered nodes that draw power from a battery. Nodes 140 are network management nodes that are configured to manage the operation of portions 104 of wireless mesh network 102. Specifically, node 140-1 is configured to manage nodes 120-1, 130-1, and 130-2 within portion 104-1, and node 140-2 is configured to manage nodes 120-2, 130-3, and 130-4 within portion 104-2. Nodes 140-1 and 140-2 are also configured to communicate with one another in order to perform cross-mesh routing between portions 104-1 and 104-2.

Source node 110 is able to communicate with certain nodes 120 and 130 via communication links 132. Nodes 120, 130, and 140 communicate amongst themselves via communication links 134. Nodes 120 and 130 communicate with destination node 112 via communication links 136. Network system 100 may also include one or more access points (APs) 150, a network 152, and a server 160. A discovery protocol may be implemented to determine node adjacency to one or more adjacent nodes. For example, node 120-1 may execute the discovery protocol to determine that nodes 110, 140-1, and 130-1 are adjacent to node 120-1. Furthermore, this node adjacency indicates that communication links 132 and 134 may be established. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one node 120, 130, or 140, source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each node 120 and 130 may be configured to forward the payload data based on the destination address. Alternatively, the payload data may include a header field configured to include at least one switch label to define a predetermined path from source node 110 to destination node 112. A forwarding database may be maintained by each node 120 and 130 that indicates which communication link 132, 134, 136 should be used and in what priority to transmit the payload data for delivery to the destination node 112. The forwarding database may be supplied by one of nodes 140 in response to a registration procedure. The forwarding database may represent multiple paths to the destination address, and each of the multiple paths may include one or more cost values. Any technically feasible type of cost value may characterize a link or a path within network system 100. In one embodiment, each node within wireless mesh network 102 implements substantially identical functionality, and each node may act as a source node, destination node, intermediate node, or network management node.

In network system 100, access points 150-1 and 150-2 are configured to communicate with at least one node within wireless mesh network 102, such as intermediate node 120-1 or 130-3. Communication may include transmission of payload data, time-related data, or any other technically relevant data between an access point 150 and the at least one node within the wireless mesh network 102. For example, a communications link may be established between access point 150-1 and intermediate node 130-3 to facilitate transmission of payload data between portion 104-2 and network 152. Network 152 is coupled to the server 160 and configured to provide a communication path between wireless mesh network 102 and server 160. Network 152 may comprise any wired, optical, wireless, or hybrid network configured to transmit payload data between access points 150 and server 160.

In one embodiment, the server 160 represents a destination for payload data originating within the wireless mesh network 102 and a source of payload data destined for one or more nodes within wireless mesh network 102. For example, nodes within wireless mesh network 102 may perform measurements to generate measurement data, such as power consumption data. Server 160 may execute an application to collect the measurement data and report the measurement data. In one embodiment, server 160 queries nodes within wireless mesh network 102 for certain data. Each queried node replies with requested data, such as consumption data, system status and health data, and so forth. In an alternative embodiment, each node within wireless mesh network 102 autonomously reports certain data, which is collected by server 160 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and a corresponding access point 150 may be via a radio-frequency local-area network (RF LAN), while communications between access points 150 and network 152 may be via a WAN such as a general packet radio service (GPRS). Each node 120, 130, and 140 within wireless mesh network 102 includes a network interface that enables the node to communicate wirelessly with other nodes, as described in greater detail below in conjunction with FIG. 2.

Figure 2:
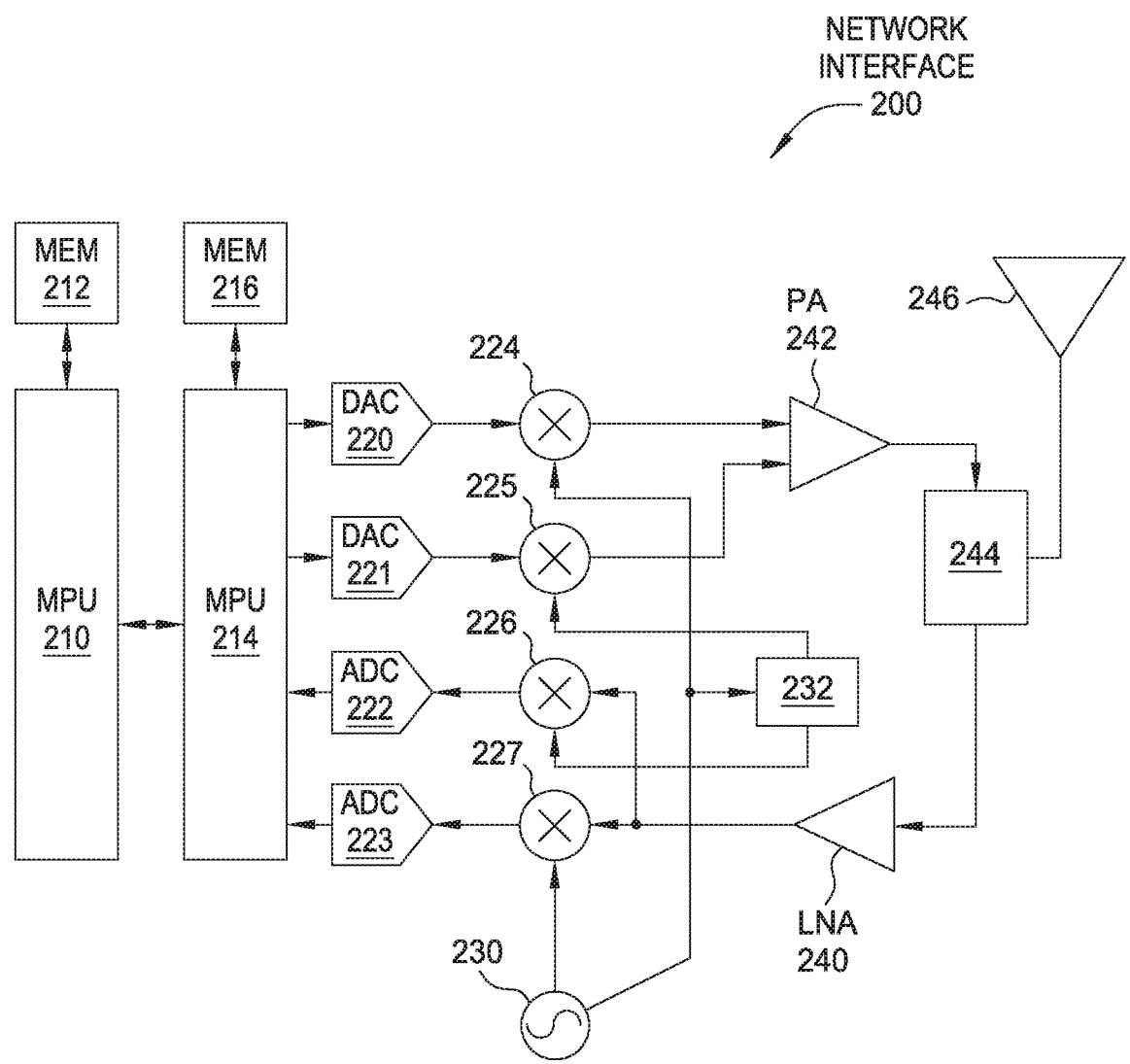
FIG. 2 illustrates a network interface configured to transmit and receive data within a mesh network, according to one embodiment of the present invention.

FIG. 2 illustrates a network interface configured to transmit and receive data within a mesh network, according to one embodiment of the present invention. Each node 110, 112, 120, 130, and 140 within wireless mesh network 102 of FIG. 1 includes at least one instance of network interface 200. In continuously-powered nodes 120, network interface 200 may draw power from an external power source, such as the power grid, to perform the various functionalities described below. In battery-power nodes 130, network interface 200 may be coupled to a battery included within the node 130, and network interface 200 may draw power from the batter to perform the various functionalities described below. In the latter case, network interface 200 may become active only intermittently, and at scheduled times, in order to receive and/or transmit data. In this fashion, a battery-powered node 130 that includes network interface 200 may conserve power. This power-saving technique is described in greater detail below in conjunction with FIGS. 5-7B.

As shown, network interface 200 includes, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node that includes network interface 200, when MPU 210 executes a firmware program stored in memory.

MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or MPU 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or MPU 214 may buffer within memory 212 and/or memory 216 any portion of data received across the set of channels from which antenna 246 receives data, including all such data. MPU 210 and/or MPU 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
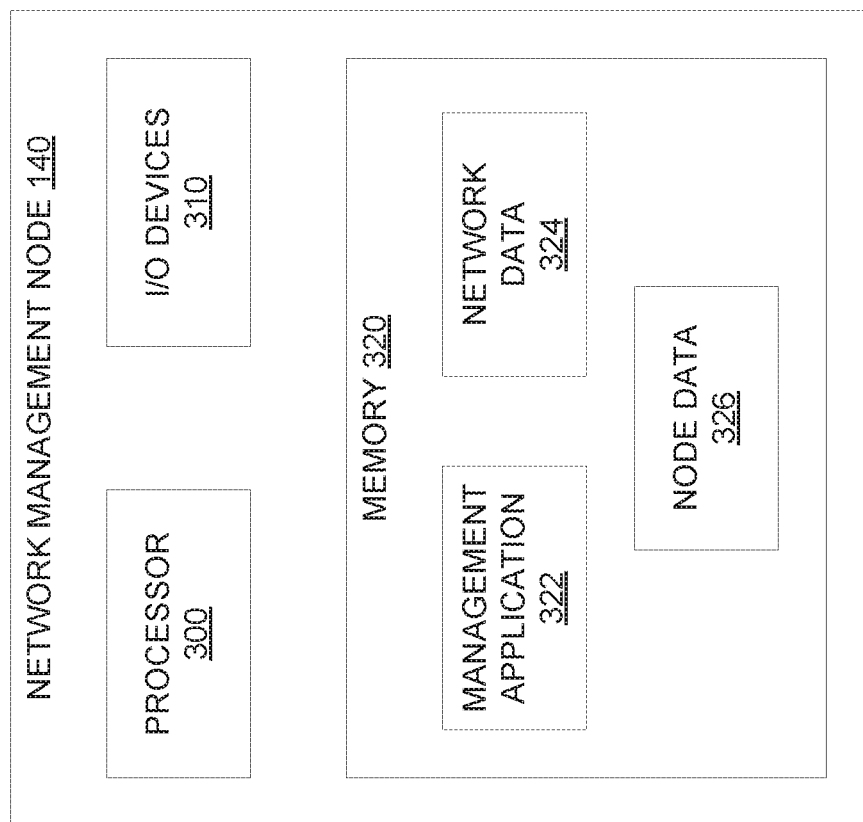
FIG. 3 is a more detailed illustration of the network management node of FIG. 1 configured to manage the operation of a portion of the network system, according to one embodiment of the present invention.

FIG. 3 is a more detailed illustration of the network management node of FIG. 1 configured to manage the operation of a portion of the network system, according to one embodiment of the present invention. As shown, network management node 140 includes a processor 300, input/output (I/O) devices 310, and a memory 320. Memory 320 includes a management application 322, network data 324, and node data 326.

Processor 300 may be any technically feasible hardware unit configured to execute applications and process data. Processor 300 could be, for example, a central processing unit (CPU), application specific integrated circuit (ASIC), microprocessor, and so forth, without limitation. I/O devices 310 may include any technically feasible devices configured to receive and/or provide data. I/O devices 310 could include, for example, input devices such as receivers, output devices such as transmitters, or combination input/output devices such as transceivers. In one embodiment, I/O devices 310 include an instance of network interface 200. Memory 320 may be any technically feasible computer-readable and/or writable storage medium. Memory 320 could include, for example, random access memory (RAM), flash memory, read-only memory (ROM), and so forth, without limitation.

Management application 322 is a software program that, when executed by processor 300, causes node 140 to manage a network portion 104. In doing so, management application 322 causes node 140 to transmit network data 324 and node data 326 to other nodes within the network portion 104. Network data 324 generally includes routing information, including neighbor tables and forwarding databases, among other network-oriented data associated with network portion 104. Node data 326 generally includes operational parameters associated with the nodes in network portion 104. The operational parameters could include transmit parameters, receive parameters, and other parameters that influence node functionality across network portion 104.

A given node 120 or 130 may interact with a node 140 in order to obtain network data 324 and/or node data 326. Based on that data, the receiving node may then discover and acquire neighbors within network portion 104, perform routing operations, and generally participate in wireless mesh network 102. The process of obtaining the aforesaid data may occur in the context of a registration process initiated by a node 120 or 130 with node 140. Node 140 may provide network data 324 and node data 326 to each node within network portion 104 in order to facilitate the formation of that portion. This process is described in greater detail below in conjunction with FIGS. 11A-12. In one embodiment, node 140 receives network data 324 and node data 326 from server 160. An exemplary implementation of server 160 is described in greater details below in conjunction with FIG. 4.

Figure 4:
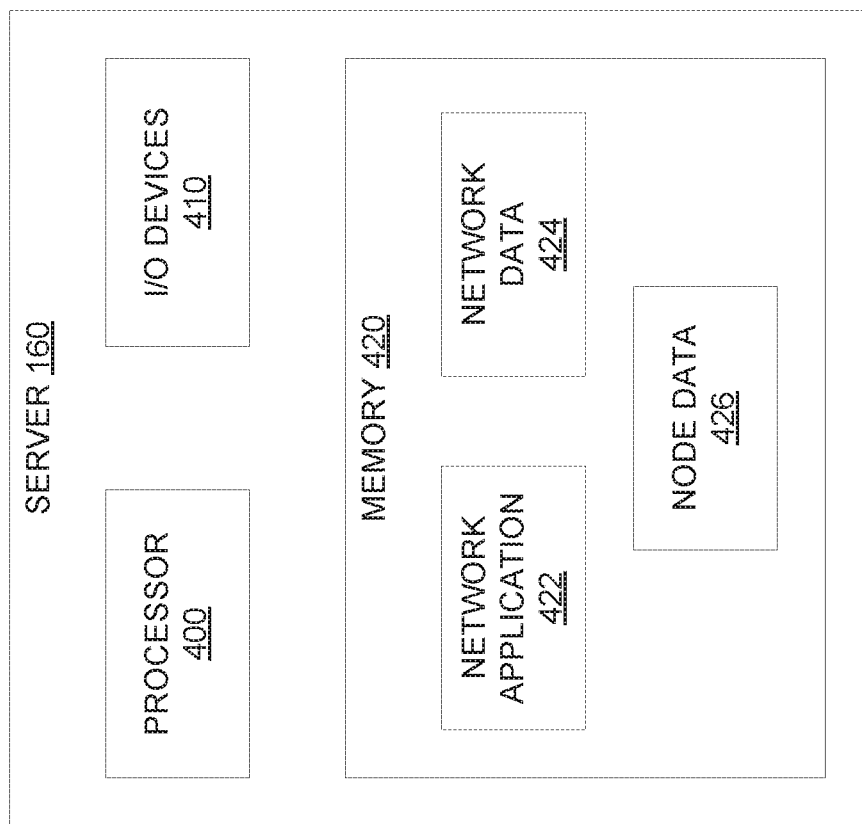
FIG. 4 is a more detailed illustration of the server of FIG. 1 configured to interoperate with the network management node, according to one embodiment of the present invention.

FIG. 4 is a more detailed illustration of the server of FIG. 1 configured to interoperate with the network management node, according to one embodiment of the present invention. As shown, server 160 includes a processor 400, input/output (I/O) devices 410, and a memory 420. Memory 420 includes a network application 422, network data 424, and node data 426.

Processor 400 may be any technically feasible hardware unit configured to execute applications and process data. Processor 400 could be, for example, CPU, ASIC, microprocessor, and so forth, without limitation. I/O devices 410 may include any technically feasible devices configured to receive and/or provide data. I/O devices 410 could include, for example, input devices such as receivers, output devices such as transmitters, or combination input/output devices such as transceivers. Memory 420 may be any technically feasible computer-readable and/or writable storage medium. Memory 420 could include, for example, RAM, flash memory, ROM, and so forth, without limitation.

Network application 324 is a software program that, when executed by processor 400, coordinates the functionality of server 160. In doing so, network application 422 causes server 160 to transmit network data 424 and node data 426 to nodes within wireless mesh network 102. Server 160 may transmit different network data 424 to each different network portion 104. For example, network data 324 shown in FIG. 3 may reflect a portion of network data 424 that is associated with a particular network portion 104. Network data 424 generally includes routing information, including neighbor tables and forwarding tables, among other network-oriented data. Node data 426 may reflect operational parameters that include transmit parameters, receive parameters, and other parameters that influence node functionality across wireless mesh network 102.

A given node 140 may interact with server 160 in order to obtain network data 424 and/or node data 426. Node 140 may then manage the nodes within a network portion 104 by providing those nodes with the aforesaid network and/or node data, as discussed above on conjunction with FIG. 3. In this manner, server 160 manages the operation of nodes 140, which, in turn, manage the operation of nodes 120 and 130 within a corresponding network portion 104. Nodes 120 and 130 are configured to operate according to a specific set of operating states, as described below in conjunction with FIG. 5.

Node Functional Overview and Communication Protocol

Figure 5:
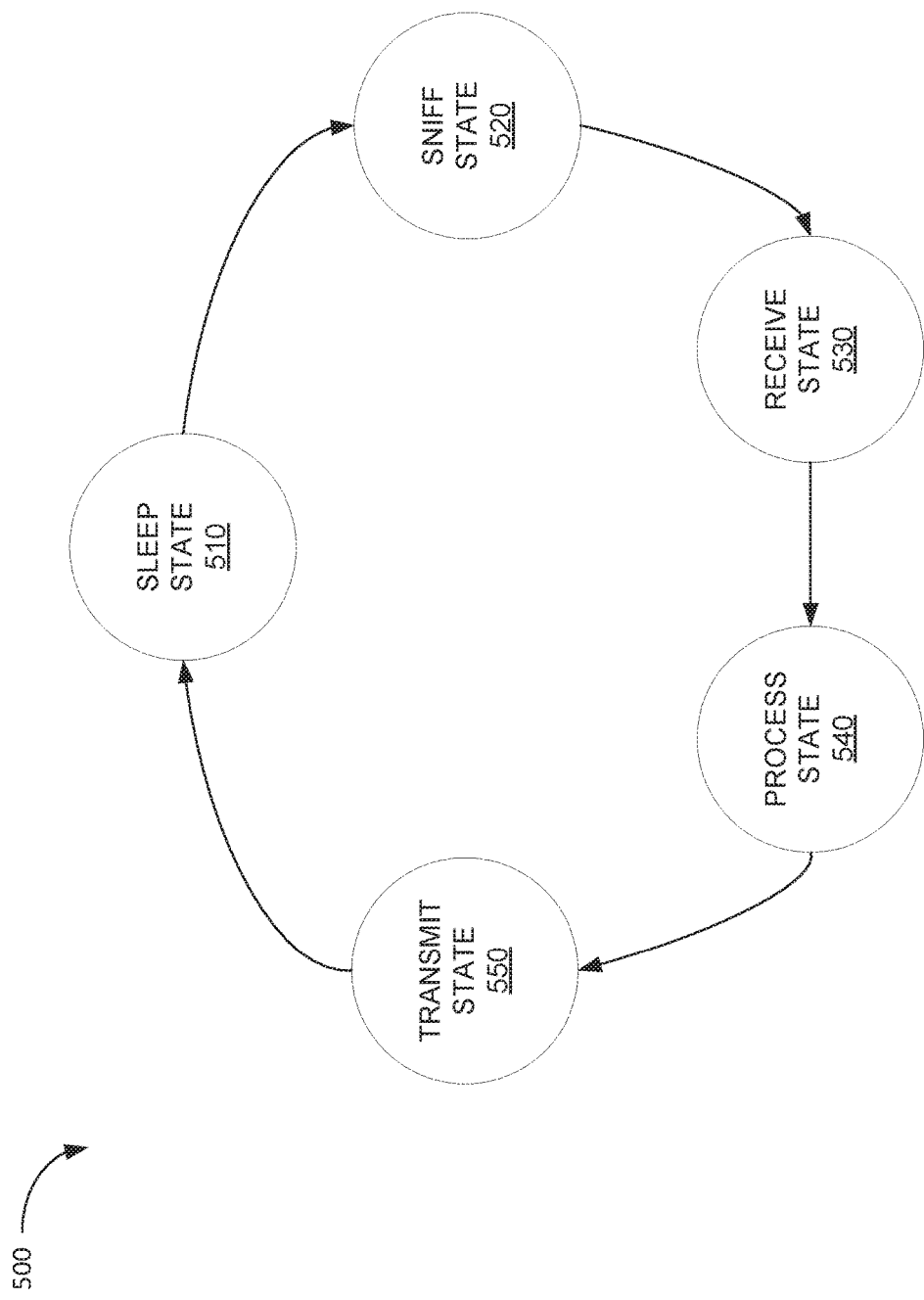
FIG. 5 is a state diagram illustrating operating states associated with the different nodes of FIG. 1, according to one embodiment of the present invention.

FIG. 5 is a state diagram illustrating operating states associated with the different nodes of FIG. 1, according to one embodiment of the present invention. Any of nodes 110, 112, 120, 130, or 140 may implement state diagram 500. In some embodiments, network management nodes 140 may implement a different state diagram that is not described herein. As shown, state diagram 500 includes five operating states: sleep state 510, sniff state 520, receive state 530, process states 540, and transmit state 550. Although several exemplary state transitions are shown, certain other state transitions have been omitted, for clarity. In practice, any of the states within state diagram 500 may transition to any of the other states under circumstances that may not be explicitly disclosed herein. As described in greater detail below, although continuously-powered nodes 120 and battery-powered nodes 130 alike may implement state diagram 500, those different types of nodes may spend differing amounts of time in each state. In particular, battery-powered nodes 130 may spend much more time in sleep state 510 compared to continuously-powered nodes 130. In this fashion, battery-powered nodes 130 may conserve power.

Sleep state 510 is a low-power operating mode during which some or most of the hardware within the node is powered down. The node may enter sleep state 510 periodically depending on the power resources and power consumption of the node. For example, a continuously-powered node 120 may enter sleep state 510 rarely or never, given that the node 120 has access to plentiful power resources. Conversely, a battery-powered node 130 may enter sleep state 510 often, given that the node 130 only has access to limited battery power resources. In practice, continuously-powered nodes 120 may not enter sleep state 510 at all under normal operating conditions, while battery-powered nodes 130 may reside in sleep state 510 most of the time.

Sniff state 520 is another low-power operating mode during which specific receiving hardware within the node is activated in order to "sniff" energy associated with radio signals. Other hardware within the node may be powered down, thereby conserving power. The node may enter sniff state 520 at a particular time, and on a specific channel or frequency, in order to detect radio signals intended for reception at that particular time and on that particular channel. When the active hardware detects at least a threshold level of energy, the remaining portions of hardware within the node may be powered up, in response, in order to receive the signal. Generally, nodes within wireless mesh network 102 transmit packets that include a preamble. Upon being sniffed by a receiving node, the preamble triggers the receiving node to power on and receive the payload included in the packet. In some embodiments, continuously-powered nodes 120 may not enter sniff state 520, since those nodes are not power-limited. Instead, in such embodiments, continuously-powered nodes 120 may enter receive state 530.

Receive state 530 is an operating mode for receiving radio signals. As mentioned above, receive state 530 may be entered when a preamble is detected during sniff state 520. The node may also directly enter receive state 530 under various circumstances. While in receive state 530, the node generally powers on most or all of the receiving hardware within the node, including the receiving portions of network interface 200 shown in FIG. 2.

Process state 540 is an operating mode whereby the node processes received data, processes data for subsequent transmission, and performs various other processing operations. The node includes a bit stream processor that is active during process state 540, as well as another processor for running protocol and executing software applications while in process state 540. In addition, the node may include other peripheral processors for performing cryptographic functions or other specialized operations.

Transmit state 550 is an operating mode within which the node transmits data to other nodes. The node may enter transmit state 550 at a specific time and then transmit on a particular channel in order to target another node. Specifically, and as described in greater detail below, the node is configured to compute a time and a channel for targeting a specific node that is based on the media access control (MAC) address of the specific node, the time the transmission will be received, and the number of channels used in wireless mesh network 102. Maintaining accurate time across the nodes within wireless mesh network 102 is therefore a priority, and so nodes 120, 130, and 140 are configured to exchange "time beacons" with one another that include the current time. An exemplary time beacon is described below in conjunction with FIG. 6.

Figure 6:
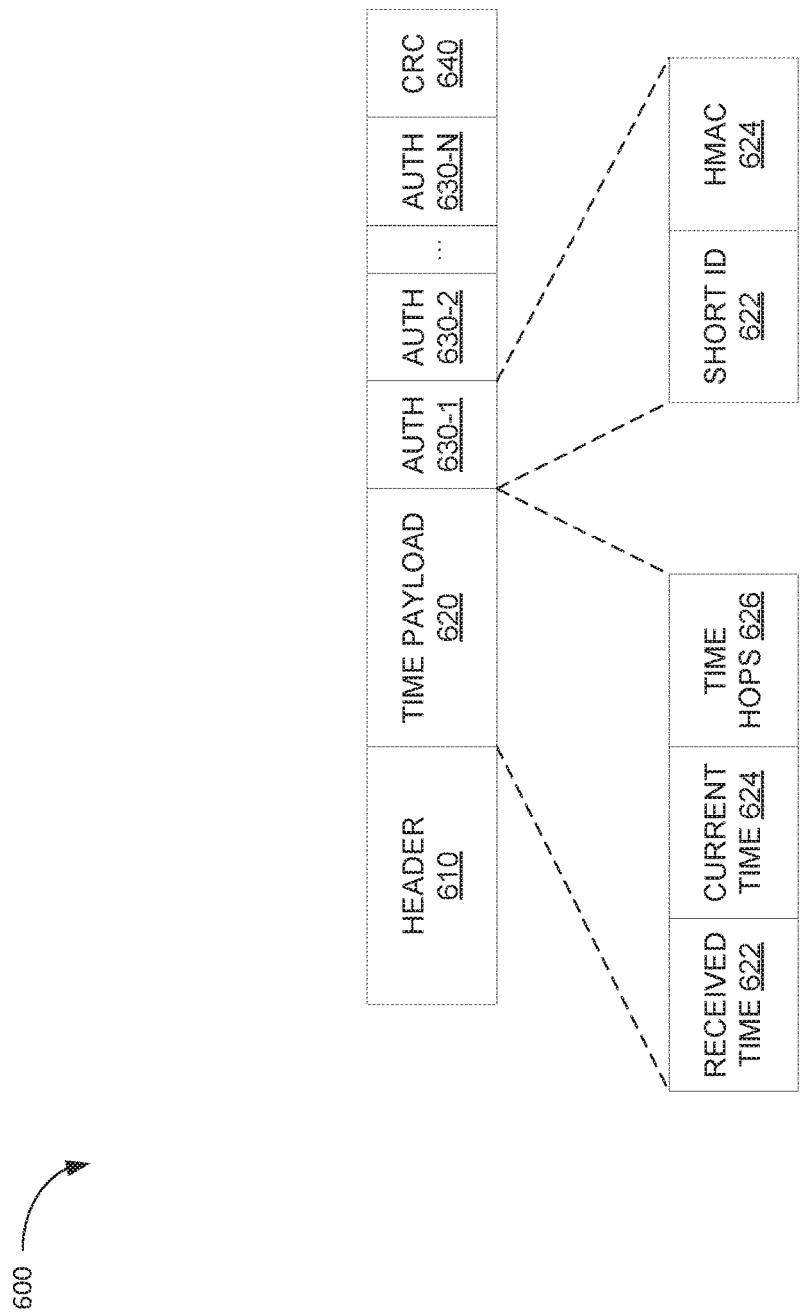
FIG. 6 illustrates a time beacon for sharing time between the different nodes of FIG. 1, according to one embodiment of the present invention.

FIG. 6 illustrates a time beacon for sharing time between the different nodes of FIG. 1, according to one embodiment of the present invention. As shown, time beacon 600 includes a header 610, a time payload 620, authentication sections 630-1 through 630-N, and cyclic redundancy check 640. Time payload 620 includes received time 622, current time 624, and time hops 626. Each authentication section 620 includes a short identifier (ID) 622 and a hash message identification code (HMAC) 624.

In practice, a continuously-powered node 120 receives a time signal from an external source and sets an internal clock based on that time. The external source could be any technically feasible service that is accessible via network 152 and provides reasonably accurate time. The continuously-powered node 120 then transmits instances of time beacon 600 to neighboring nodes. The neighboring nodes could be continuously-powered nodes 120 or battery-powered nodes 130. Upon receipt of an instance of time beacon 600, the receiving node likewise sets an internal clock, and may then transmit another instance of time beacon 600 to downstream neighboring nodes. In this fashion, time propagates across wireless mesh network 102. Generally, the nodes of wireless mesh network 102 share instances of time beacon 600 with one another according to a time beacon schedule. The time beacon schedule could be established by a network management node 140, for example, or be determined independently by each node.

In time beacon 600, received time 622 indicates the time as received by the node which transmitted time beacon 600. Current time 624 indicates the time when time beacon 600 was sent. Time hops 626 indicates the number of hops between the transmitting node and the external source of time. Time hops 626 generally reflects the accuracy of received time 622 and current time 624. In particular, time that has propagated many hops across the network is generally less accurate than time received closer to the external source of time, since each hop may introduce drift associated with an intermediate node.

Each authentication section 630 is generally associated with a different neighboring node and includes a short ID 622 that is associated with the corresponding neighboring node. When two nodes first discover each other, those two nodes may exchange short IDs 622 in preparation for subsequently exchanging time beacons 600. A node that receives time beacon 600 is configured to access a specific authentication section 630 based on the assigned short ID 622, and then perform various security checks with the corresponding HMAC 624. In this fashion, nodes may protect against network attacks that involve sourcing inaccurate time into wireless mesh network 102. The receiving node may also check CRC 640 for data integrity purposes. In one embodiment, a given node may receive multiple different instances of time beacon 600, and then combine the data included therein in order to generate a time estimate. For example, the node could average the current time indicated by each such time beacon instance.

Figure 7A:
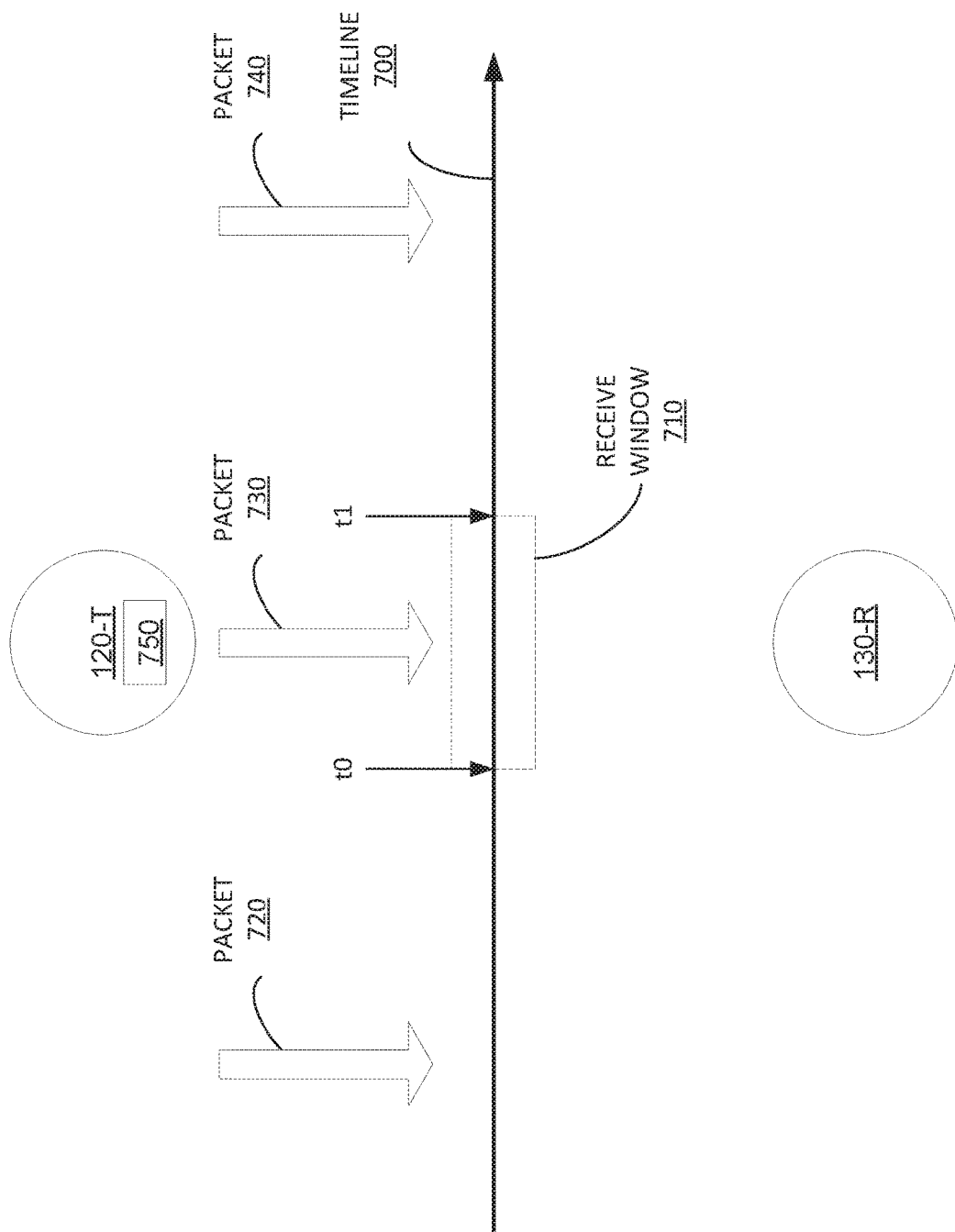
FIGS. 7A-7B are conceptual diagrams illustrating a technique for performing data communication between the different nodes of FIG. 1, according to one embodiment of the present invention.
Figure 7B:
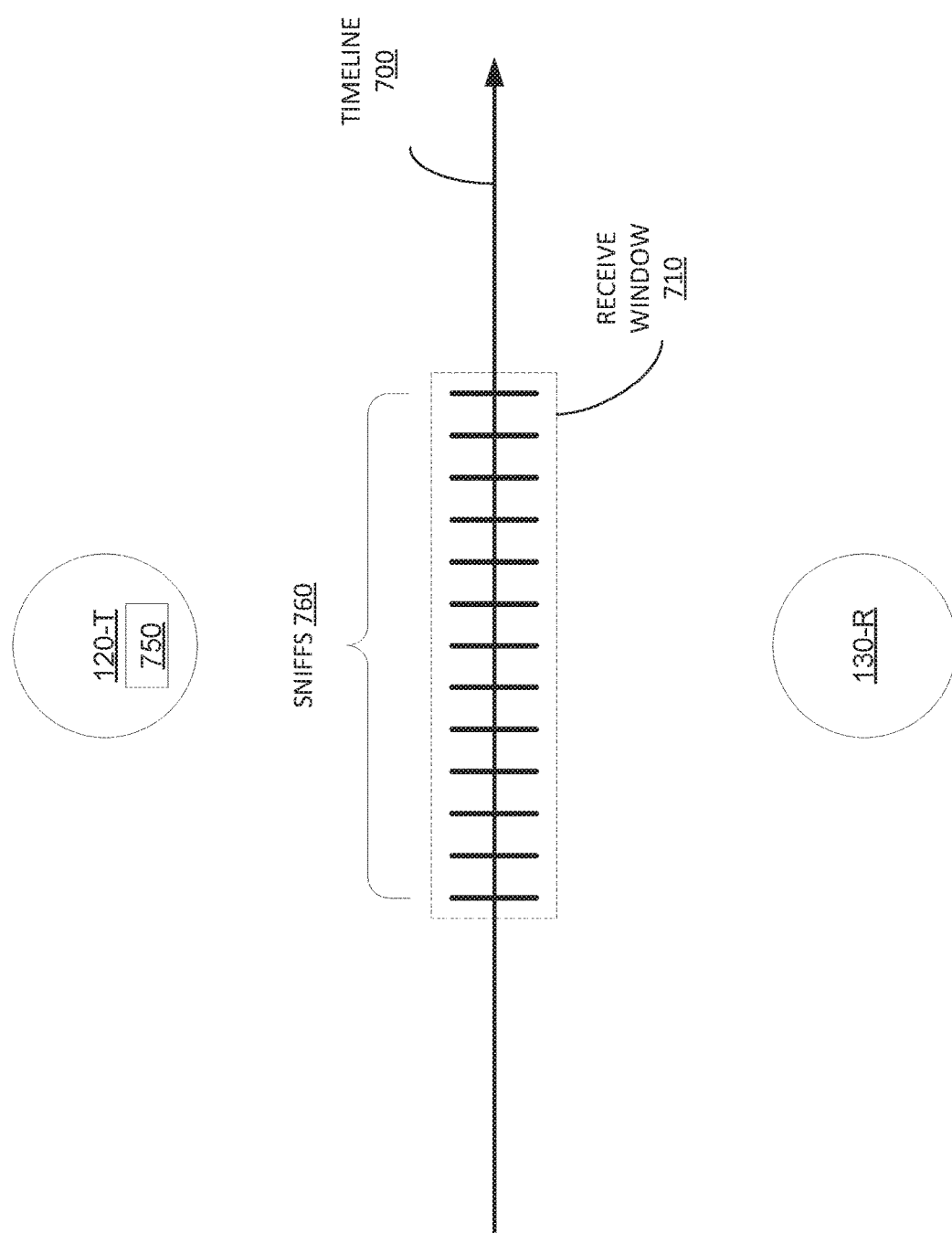

As mentioned above, the sharing of accurate time is important for synchronizing transmissions between nodes. In networks with many battery-powered nodes 130 that reside in sleep state 510 for long periods of time, targeting those nodes when sniffing or receiving is central to maintaining network connectivity. In other words, the ability for nodes within wireless mesh network 102 to properly and effectively communicate traffic across the network depends on accurate timing. FIGS. 7A-7B illustrate techniques for targeting transmissions based on time measurements.

FIGS. 7A-7B are conceptual diagrams illustrating a technique for performing data communication between the different nodes of FIG. 1, according to one embodiment of the present invention. As shown in FIG. 7A, a transmitting node 120-T transmits messages to a receiving node 130-R at different points in time along timeline 700. Node 130-R is a battery-powered node and therefore resides in sleeping mode 510 much of the time. However, node 130-R becomes active during receive window 710. Receive window 710 has a duration from t0 to t1. Node 120-T may be configured to schedule transmissions so that node 130-R receives transmissions during receive window 710.

Problems may arise when nodes 120-T and 130-R are not sufficiently time synchronized. In particular, if an internal clock associated with node 130-T is faster or slower than an internal clock associated with node 130-R, then node 120-T may transmit too early or too late, respectively, and miss receive window 710. For example, in FIG. 7A, node 130-T could transmit packet 720 before time t0, and, consequently, node 130-R would be in sleep mode 510 when that packet arrived. Alternatively, node 120-T could transmit packet 740 after time t1, and node 130-R would have already returned to sleep mode 510 when that packet arrived. In either case, poor time synchronization between nodes could result in a communication disruption. If nodes 120-T and 130-R remain in relative synchronization, node 120-T could transmit packet 730 within receive window 710, and node 130-T would be able to receive that packet. Node 130-R is configured to transmit packets to node 130-T based on a set of transmit parameters 750, as discussed in greater detail below in conjunction with FIG. 8.

Referring now to FIG. 7B, in practice, node 130-R enter sniff mode 520 during receive window 710. Again, if sufficient energy is detected while sniffing, then node 130-R may power up and receive transmissions. When operating in sniff mode 520, node 130-R performs a sequence of sniffs 760, as is shown. Each sniff reflects a short period of time when energy can be detected. Node 130-R may return to sleep mode 520 between sniffs. In this manner, power can be conserved. Node 130-T need only transmit messages with a preamble that is longer than the time between sniffs to trigger node 130-R to enter receive mode 530. Node 130-R may then receive and demodulate the actual payload of the message.

The width of receive window 710, the sniff rate with which sniffs 760 are generated, and the time between sniffs 760 (referred to hereinafter as the inter-sniff interval) are configurable parameters. Node 130-R may select these parameters based on battery life, current data rate, remaining storage space, or any other technically feasible parameter. In addition, node 130-R may acquire data from a network management node 140 that reflects these parameters. Node 120-T may likewise acquire these parameters (e.g., from node 140), in order to properly target transmissions for node 130-R. For example, node 120-T could scale the preamble of a packet based on the inter-sniff interval associated with node 130-R, thereby increasing the likelihood that transmissions are received by that node. Generally, node 120-T relies on transmit parameters 750 when generating transmissions, which includes both network-oriented parameters and node-specific parameters.

FIG. 8 illustrates a set of transmit parameters according to which a node transmits data within the network system of FIG. 1, according to one embodiment of the present invention. As shown, transmit parameters 750 includes gear data, channel data, receive bandwidth, zero channel, preamble length, receive window, receive schedule, duty cycle, ACK wait time, and beacon schedule. The transmit parameters shown in FIG. 8 are provided for exemplary purposes only, and could include fewer parameters or additional parameters.

Transmit parameters 750 may be received, as a whole or in part, from the node 140 configured to manage the network portion 104 where node 120-T resides. For example, node 140 could transmit network data 324 and node data 326 to node 120-T when node 120-T registers with node 140. The specific values of each transmit parameter associated with a given node may vary depending on the type of node. For example, a battery-powered node may implement different values for transmit parameters 750 compared to a continuously-powered node. Transmit parameters 750 may be received, as a whole or in part, from node 130-R when nodes 120-T and 120-R initially discover one another. For example, nodes 120-T could obtain receive window data from node 130-R indicating the width of receive window 710. Node 120-T could then target the center of that window, thereby improving the likelihood of successful communication. Likewise, node 120-T could obtain gear data from node 130-R, and then transmit to that node using the proper data rate.

Node 120-T is configured to compute a channel and time associated with receive window 710 based on the MAC address of node 130-R, the number of channels used in wireless mesh network 102, and a time value. Nodes 120-T and 130-R may share MAC addresses with one another upon initial discovery, or receive data from node 140 indicating the MAC addresses of nearby neighbors. In one embodiment, node 120-T performs a Jenkins hash with the MAC address of node 130-R, the number of available channels, and the time at which node 130-R should receive transmissions, in order to compute the channel on which to send the transmission.

As mentioned, transmit parameters 750 may be derived from network data 324 or node data 326 supplied by node 140 shown in FIG. 3. Transmit parameters 750 may also be derived from network data 424 and node data 426 provided by server 160 shown in FIG. 4. In general, during network formation, server 160, nodes 110, 112, 120, 130, and 140 may exchange any information discussed herein in order to form communication links with one another.

Referring generally to FIGS. 1-8, by implementing the techniques discussed herein, wireless mesh network 102 supports the coexistence of many different types of nodes within a single network. Specifically, wireless mesh network 102 relies on a single communication protocol governs network communications and that can be implemented by both continuously-powered nodes 120 and battery-powered nodes 130. Again, that protocol relies on accurate maintenance of time, as well as the sharing of data that allows the proper targeting of transmissions to occur. The techniques described thus far are also described, in stepwise fashion, below in conjunction with FIG. 9.

Figure 9:
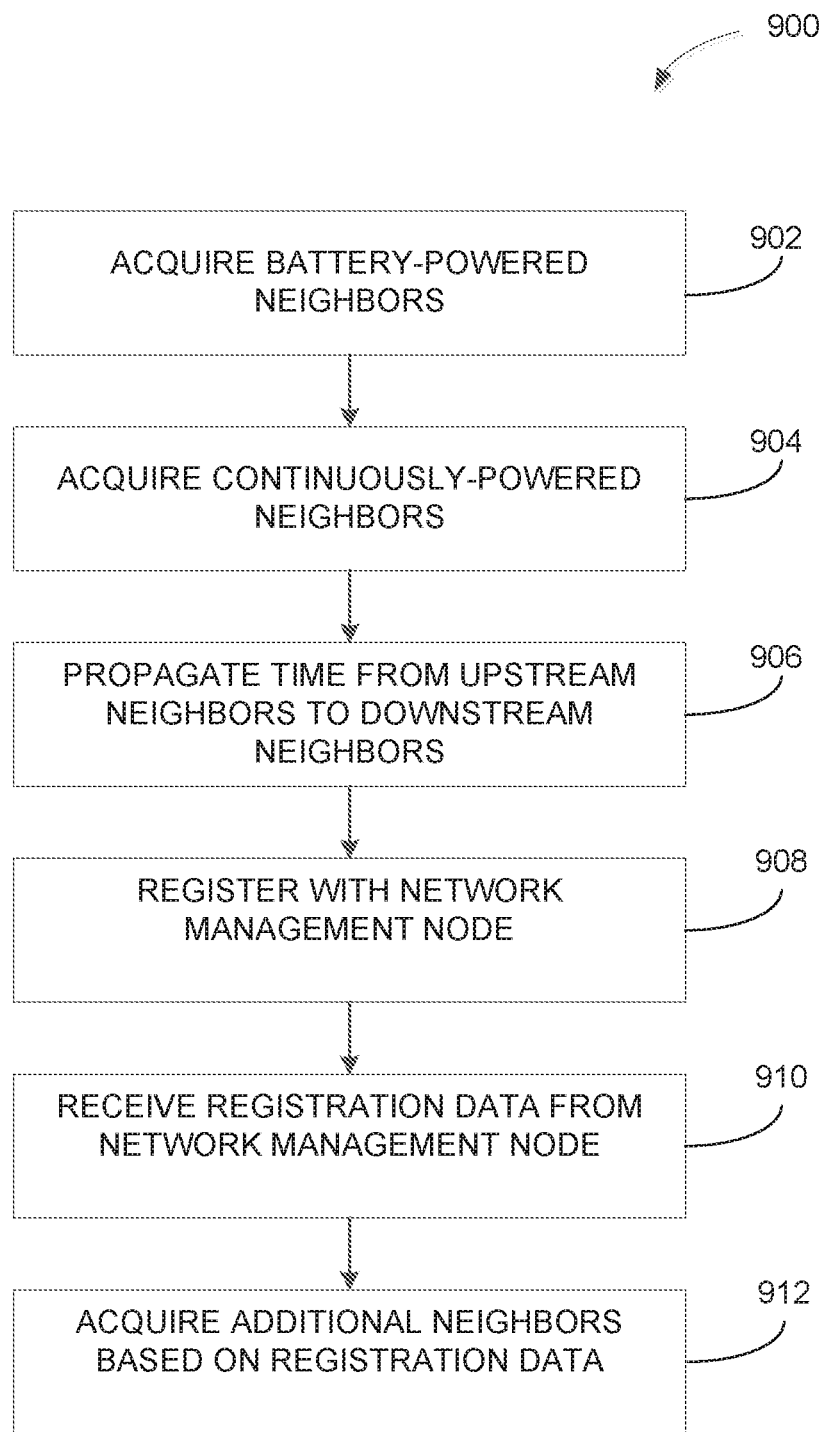
FIG. 9 is a flow diagram of method steps for participating in a wireless mesh network, according to one embodiment of the present invention.

FIG. 9 is a flow diagram of method steps for participating in a wireless mesh network, according to one embodiment of the present invention. Although the method steps are described in conjunction with the systems of FIGS. 1-8, persons skilled in the art will understand that any system configured to perform the method steps, in any order, is within the scope of the present invention.

As shown, a method 900 begins at step 902, where a node within wireless mesh network 102 acquires one or more battery-powered neighbors. The node could be a continuously-powered node 120 or a battery-powered node 130. The node may be preprogrammed to include MAC addresses associated with the battery-powered neighbors, or may acquire those MAC addresses by performing a discovery process with the neighbors. Once the node obtains the neighbor MAC addresses, the node may transmit data thereto using the targeting approach described above in conjunction with FIGS. 7A-7B.

At step 904, the node acquires one or more continuously-powered neighbors. Similar to step 902, the node may be preprogrammed to include MAC addresses associated with the continuously-powered neighbors, or may acquire those MAC addresses by performing a discovery process. Once the node obtains the neighbor MAC addresses, the node may transmit data to those neighbors using the targeting approach described above in conjunction with FIGS. 7A-7B.

At step 906, the node propagates time across the network. In doing so, the node may receive a first time beacon from an upstream neighbor. The upstream neighbor could be, for example, any of the neighboring nodes acquired in steps 902 and 904. The node may then generate a second time beacon based on the first time beacon, and transmit the second time beacon to one or more downstream neighbors. In this manner, the node propagates time from upstream neighbors to downstream neighbors.

At step 908, the node registers with one or more network management nodes 140. The network management node 140 with which the node registers could manage, for example, the network portion 104 within which the node resides, or could also manage another network portion 104. When the node registers with the network management node 140, the network management node 140 then transmits various registration data to the node, including network data 324 and node data 326.

At step 910, the node receives the registration data from the network management node 140. The registration data generally includes network-oriented data, such as the number of channels used within wireless mesh network 102, among others. The registration data also includes node-oriented data that may assist the node with acquiring neighbors. For example, the node data 326 could include MAC addresses of potential neighbors of the node, routing tables, forwarding tables, and so forth.

At step 912, the node acquires additional neighbors based on the registration data. For example, the node could parse a set of MAC addresses from the registration data, as well as the number of channels used within wireless mesh network 102, and then compute the channel and time when one or more neighboring nodes may receive data. When the receive window of one such neighbor opens, then the node may transmit a discovery packet to that node, thereby acquiring a new neighbor.

Referring generally to FIGS. 1-9, any of the nodes discussed herein may perform any of the techniques described thus far. Accordingly, those nodes may interoperate regardless of whether those nodes are battery-powered or continuously-powered. As a general matter, the techniques discussed above may be implemented by any heterogeneous collection of nodes, beyond those with different types of power sources. When a collection of such heterogeneous nodes initializes and first comes online, each such node may implement the method 900 in order to form a wireless mesh network, such as wireless mesh network 102 of FIG. 1. An example formation of a network is described below in conjunction with FIGS. 10A-10E.

Network Functional Overview and Exemplary Mesh Formation

Figure 10C:
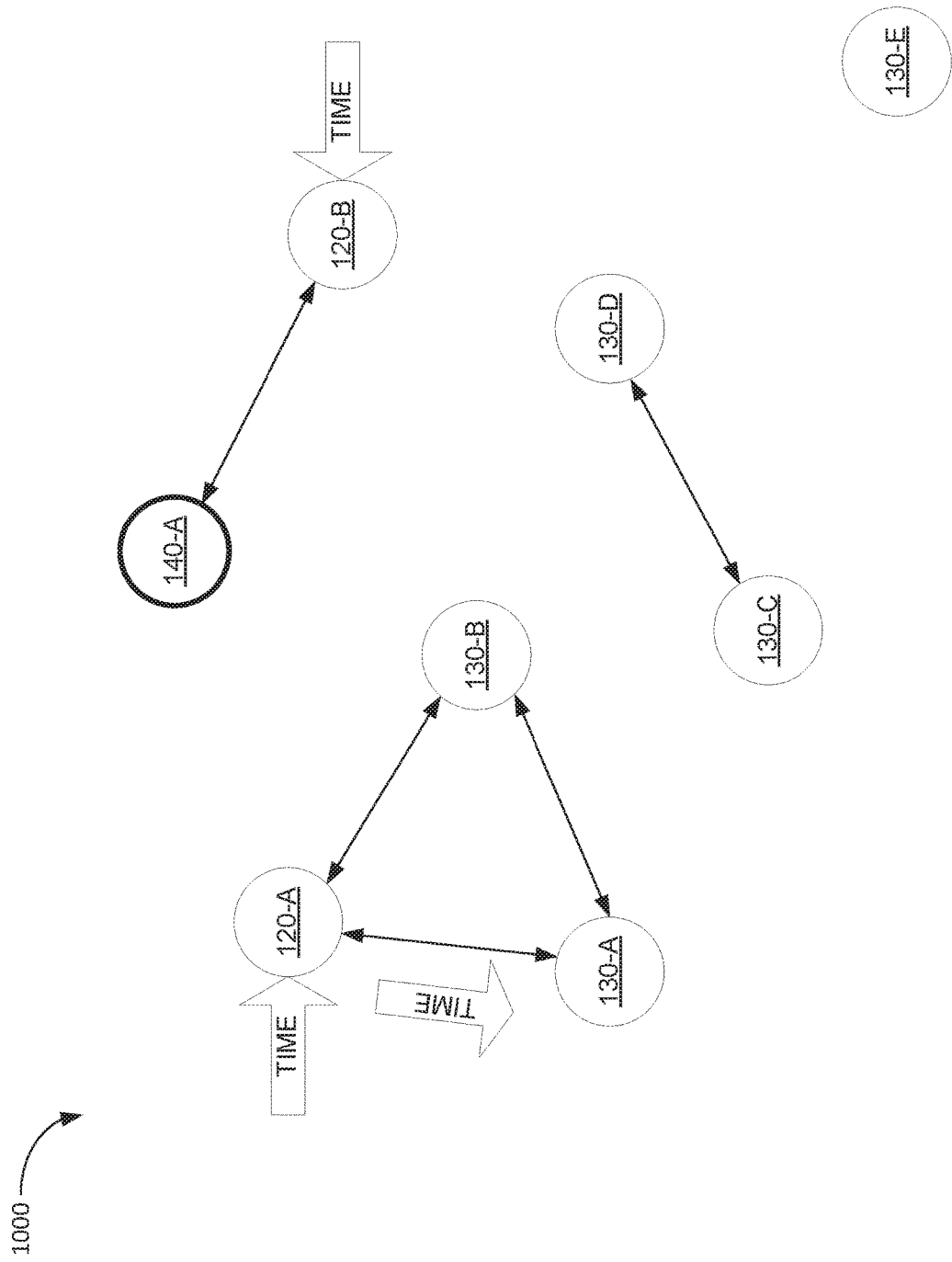

FIGS. 10A-10E are conceptual diagrams illustrating the formation of the wireless mesh network of FIG. 1, according to one embodiment of the present invention. In one embodiment, the techniques described herein may be implemented in order to form network portions 104-1 and 104-2 or, alternatively, wireless mesh network 102 as a whole. As shown in FIG. 10A, a network 1000 includes nodes 120-A and 120-B, nodes 130-A through 130-E, and node 140-A. Node 140-A is a network management node that is configured to manage some or all of network 1000. Nodes 120-A and 120-B are continuously-powered nodes that are configured to source time into network 1000, as described in greater detail below. Nodes 130-A through 130-E are battery-powered nodes. FIG. 10A illustrates the initial state of network 1000, before time has been sourced into network 100 and before any communication links have been established.

In FIG. 10B, nodes 120-A and 120-B receive a time signal from an external source. In doing so, nodes 120-A and 120-B may access the source of time via a network, such as network 152 of FIG. 1. Generally, continuously-powered nodes 120 source time into network 1000, rather than battery-powered nodes 130, because sourcing time requires power that battery-powered nodes 130 typically hold in short supply. Continuously-powered nodes 130 may not have a comparatively strict energy budget, and therefore can assume responsibility for sourcing time. Once nodes 120-A and 120-B have set internal clocks based on the received time, those nodes may begin establishing communication links with neighboring nodes.

In FIG. 10C, nodes 120-A and 120-B have begun establishing communication links with neighbors. Once those links are established, nodes 120-A and 120-B may begin propagating time across those links to the newly-acquired neighboring nodes. In particular, nodes 120-A and 120-B may transmit instances of time beacons 600 to those neighbors. Then, based on the time indicated in those beacons, the neighboring nodes may in turn acquire additional neighbors.

Figure 10D:
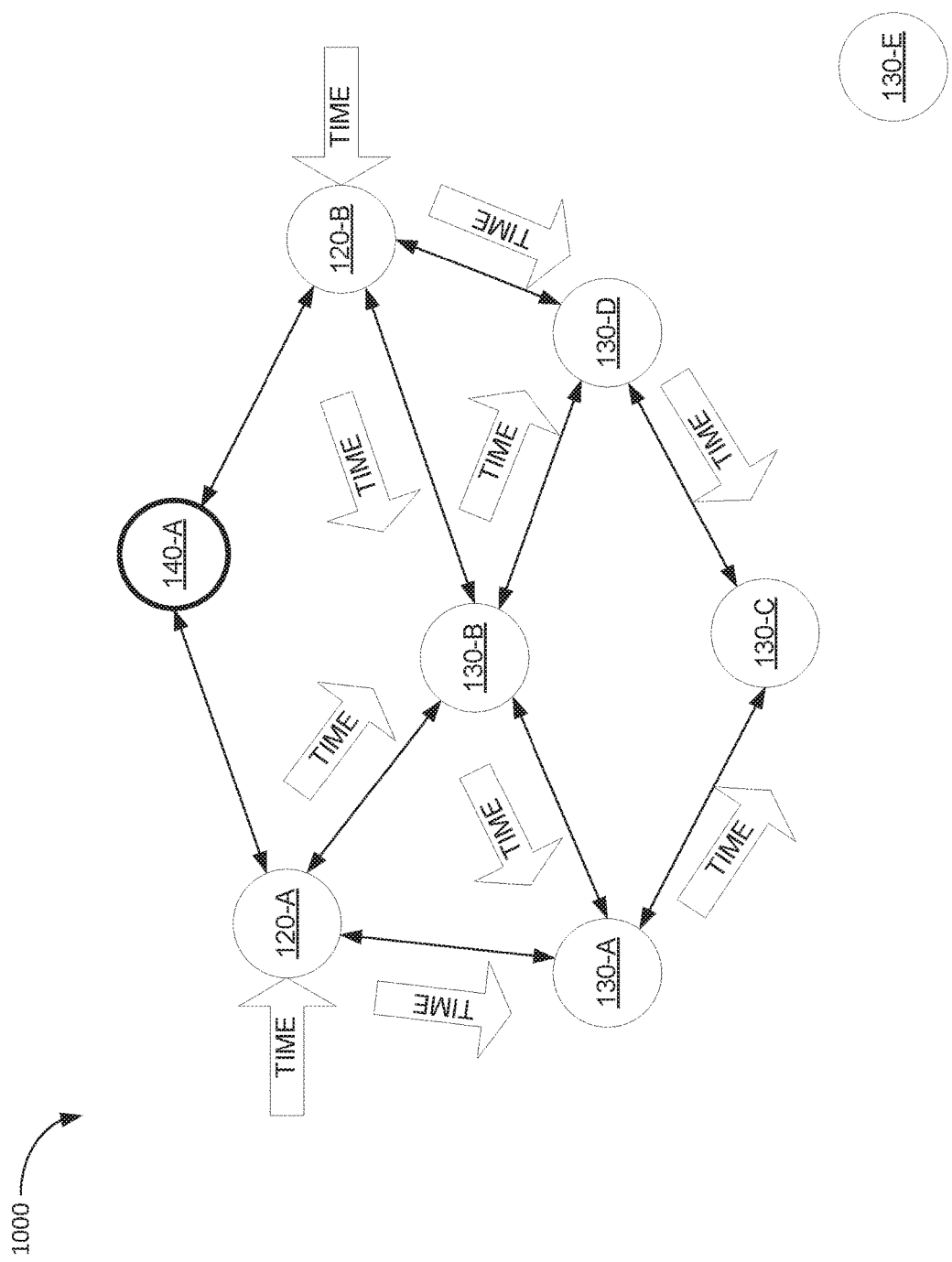

In FIG. 10D, the nodes within network 1000 have acquired significantly more neighbors, and the time signal thus propagates throughout almost the entire network, the exception being node 130-E. With time shared across so many nodes, each such node may accurately target transmissions to any of the other nodes. Accurate targeting of this nature depends on the current time, the MAC address of the targeted node, and the number of channels used within network 1000, as previously described. A given node in network 1000 may acquire network data 324 and/or node data 326 that includes such information from network management node 140-A.

Figure 10E:
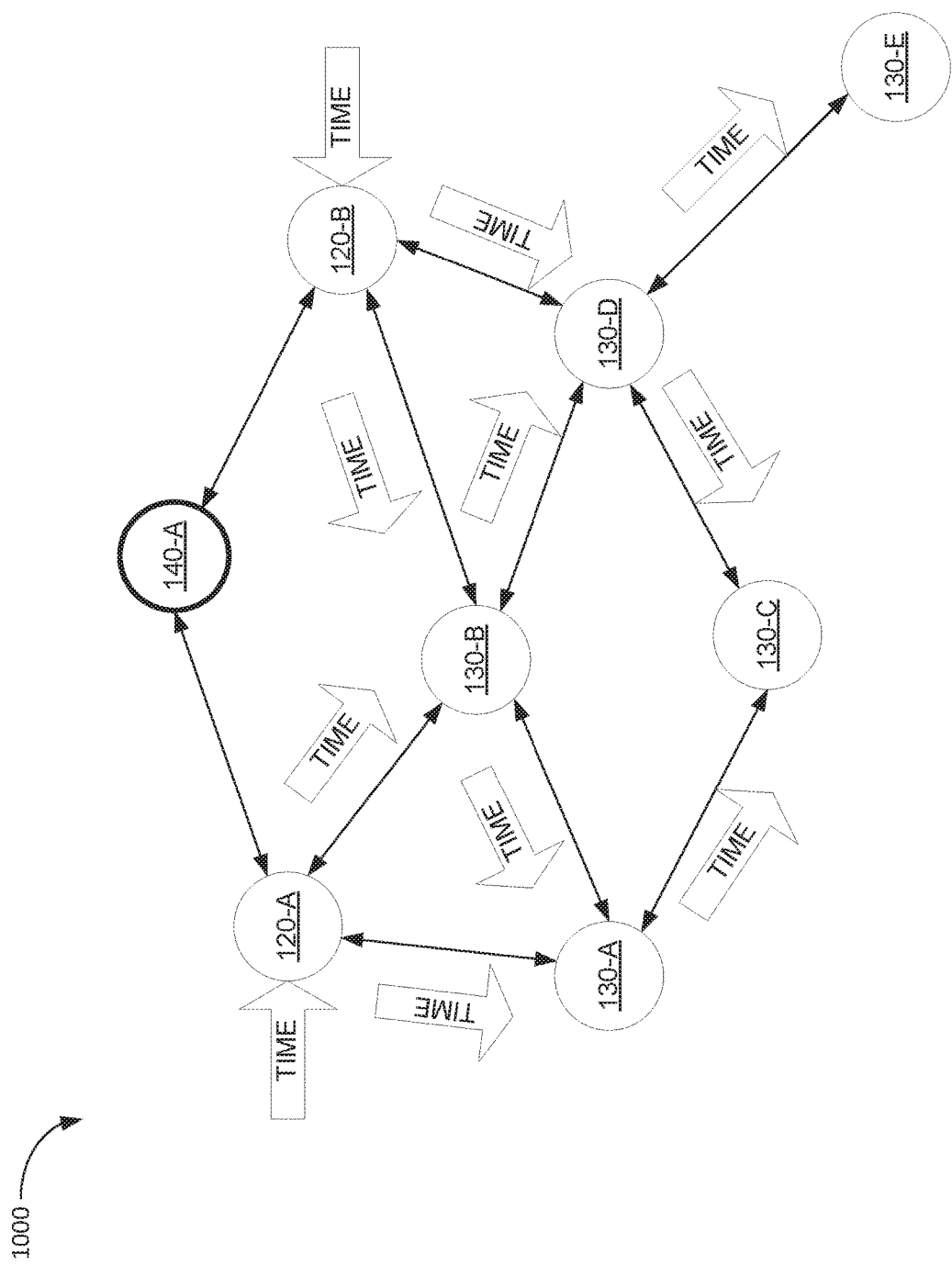

In FIG. 10E, node 130-E has finally joined network 1000. Since node 130-E is substantially farther away from the other nodes of network 1000, nodes 130-D and/or 130-E may perform various techniques in order to establish a communication link with one another. For example, node 130-D may periodically reduce a data rate when sending discovery packets to node 130-E. A lower data rate may permit transmissions from node 130-D to 130-E to cover the distance between those nodes more effectively. In addition, node 130-E may periodically widen a receive window to capture additional packets. Since node 130-E is isolated from an accurate source of time while the other nodes of network 1000 form communication links, node 130-E may not be synchronized with those other nodes. Consequently, node 130-E may not enter sniff mode 520 when node 130-D sends discovery packets. To mitigate this potential issue, node 130-E could widen the receive window until a discovery packet is received.

Referring generally to FIGS. 10A-10E, the nodes of network 1000 may obtain various data that facilitates the formation of that network. As mentioned, each node may obtain an accurate measure of time as well as MAC addresses of potential neighbors. This data allows a given node to target discovery packets to neighbors quickly. Each node may also be supplied with a network beacon schedule that indicates when local advertisement beacons will be transmitted by neighboring nodes. Based on this schedule, a given node may periodically widen the receive window until capturing a local advertisement beacon from a neighboring node. The advertisement beacon would include the MAC address of the neighboring node. Based on that MAC address, the node may then transmit discovery packets to the neighboring node to establish a communication link. In this fashion, nodes may populate neighbor tables.

In addition, node 140-A may perform various techniques to assist with the formation and growth of network 1000. For example, node 140-A, once coupled to one or more other nodes, may broadcast network data 324 and/or node data 326 to those nodes. Such data may include MAC addresses, data rates, channel information, and other types of data that may allow receiving nodes to acquire additional neighbors. As a general matter, nodes 140 may perform a wide variety of network management operations that facilitate both the formation of a network and the ongoing ability of the network to function in a robust manner. In addition, nodes 140 may interoperate with one another to join together previously disjoint portions of an overarching network. This particular functionality of nodes 140 is described in greater detail below in conjunction with FIGS. 11A-11D.

FIGS. 11A-11D are conceptual diagrams illustrating network management nodes interoperating to couple together disjoint network portions to form the network system of FIG. 1, according to one embodiment of the present invention. The techniques described below may be implemented to join together network portions 104-1 and 104-2, which, as shown in FIG. 1, may initially be disjoint from one another.

Figure 11A:
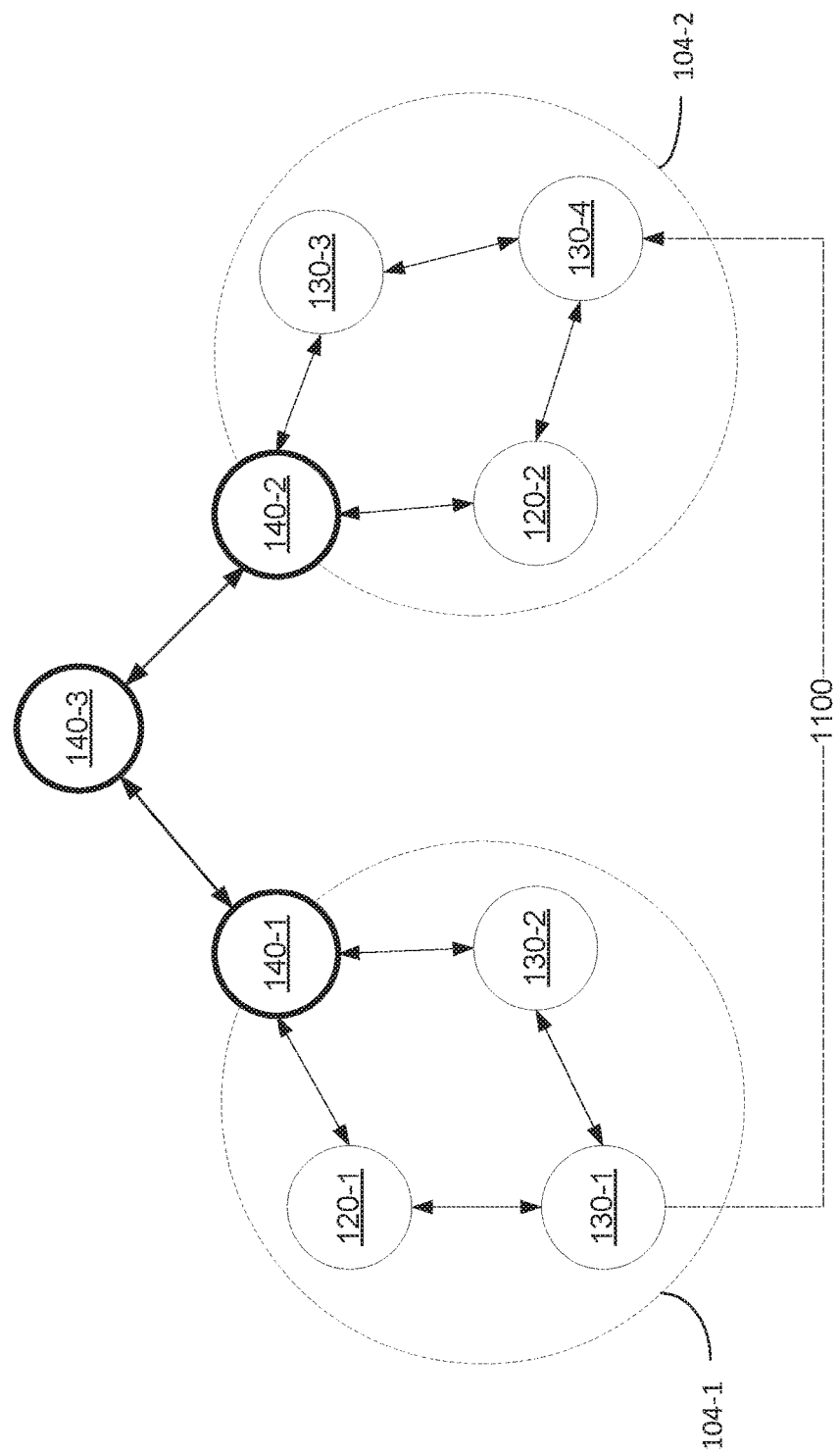
FIGS. 11A-11D are conceptual diagrams illustrating network management nodes interoperating to couple together disjoint network portions to form the network system of FIG. 1, according to one embodiment of the present invention.

As shown in FIG. 11A, each of network portions 104-1 and 104-2 of FIG. 1 are coupled to a network management node 140-3. Node 140-3 allows nodes 140-1 and 140-2 to exchange various data within one another, including network data 324 and node data 326. Network data 324 may include connectivity information, while node data 326 may include MAC addresses. This data permits nodes 130-1 and 130-4 to establish communication link 1100, as described in greater detail below.

Figure 11B:
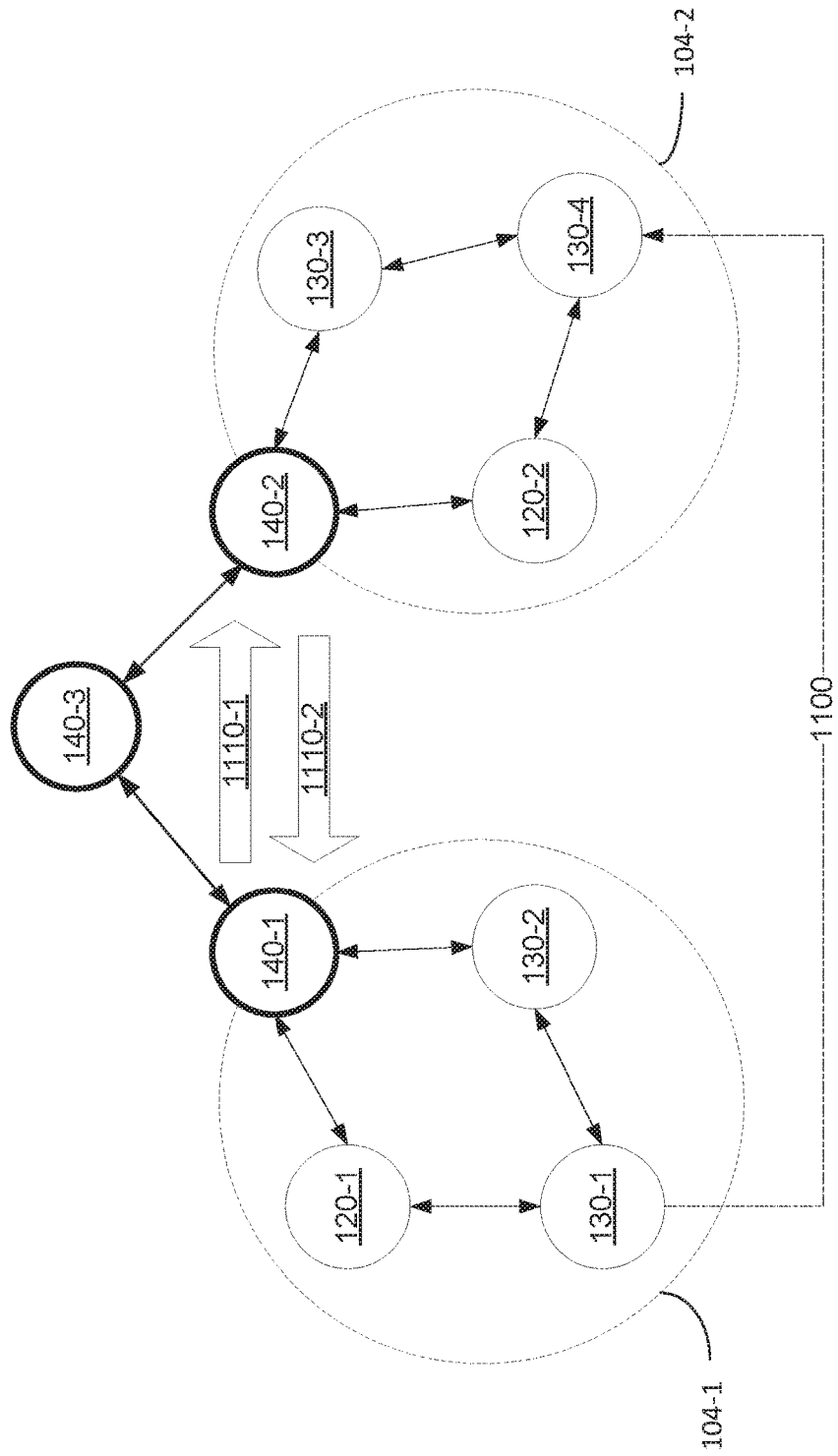

In FIG. 11B, nodes 140-1 and 140-2 exchange data 1110-1 and 1110-2 via node 140-3. Again, data 1110 includes network-oriented data and node-oriented data. Nodes 140-1 and 140-2 may exchange data 1110 when one of nodes 130-1 or 130-4 indicates that communication link 1100 is needed.

Figure 11C:
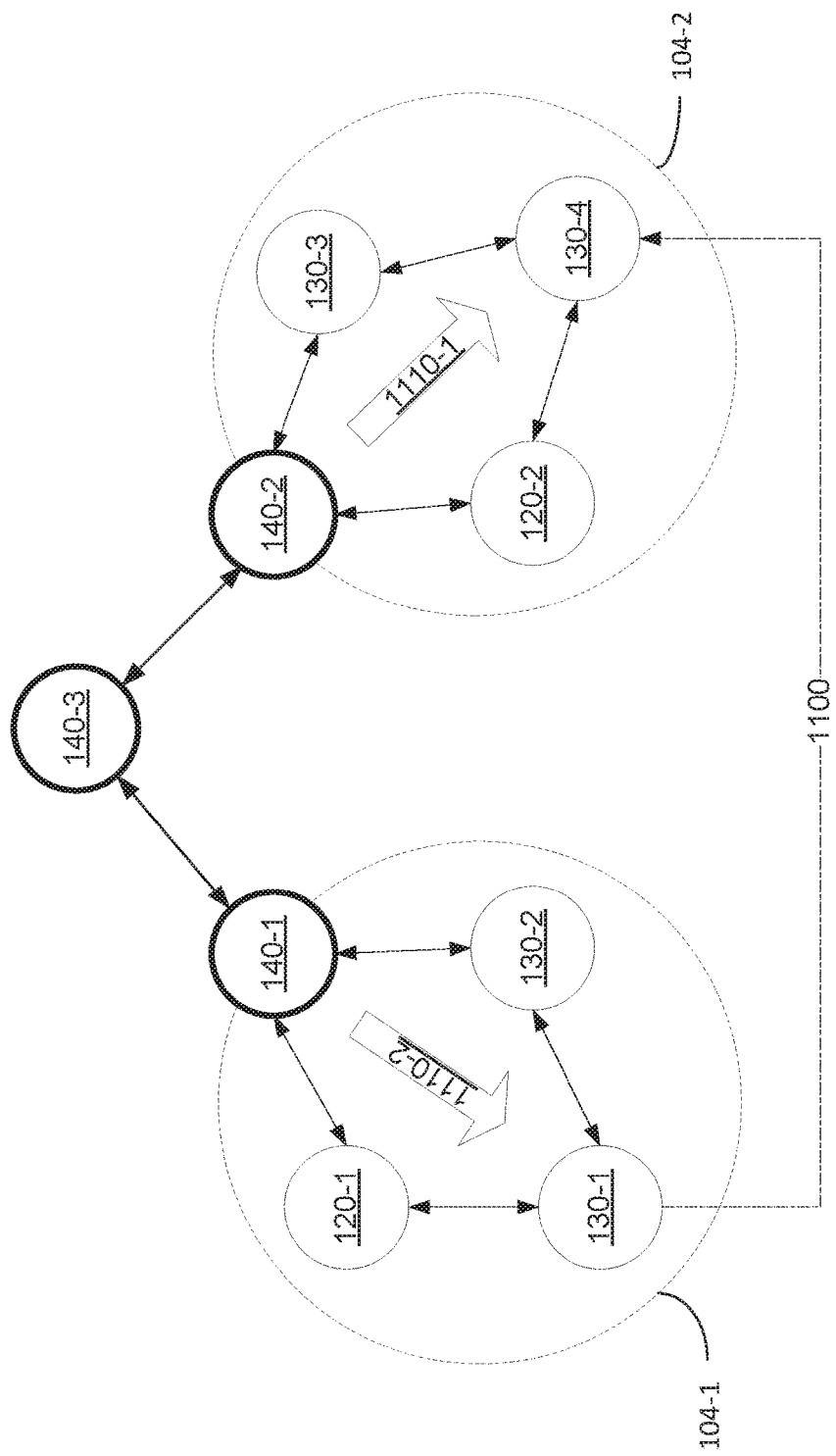

In FIG. 11C, node 140-1 transmits data 1110-2 to node 130-1, and node 140-2 transmits data 1110-1 to node 130-4.

Figure 11D:
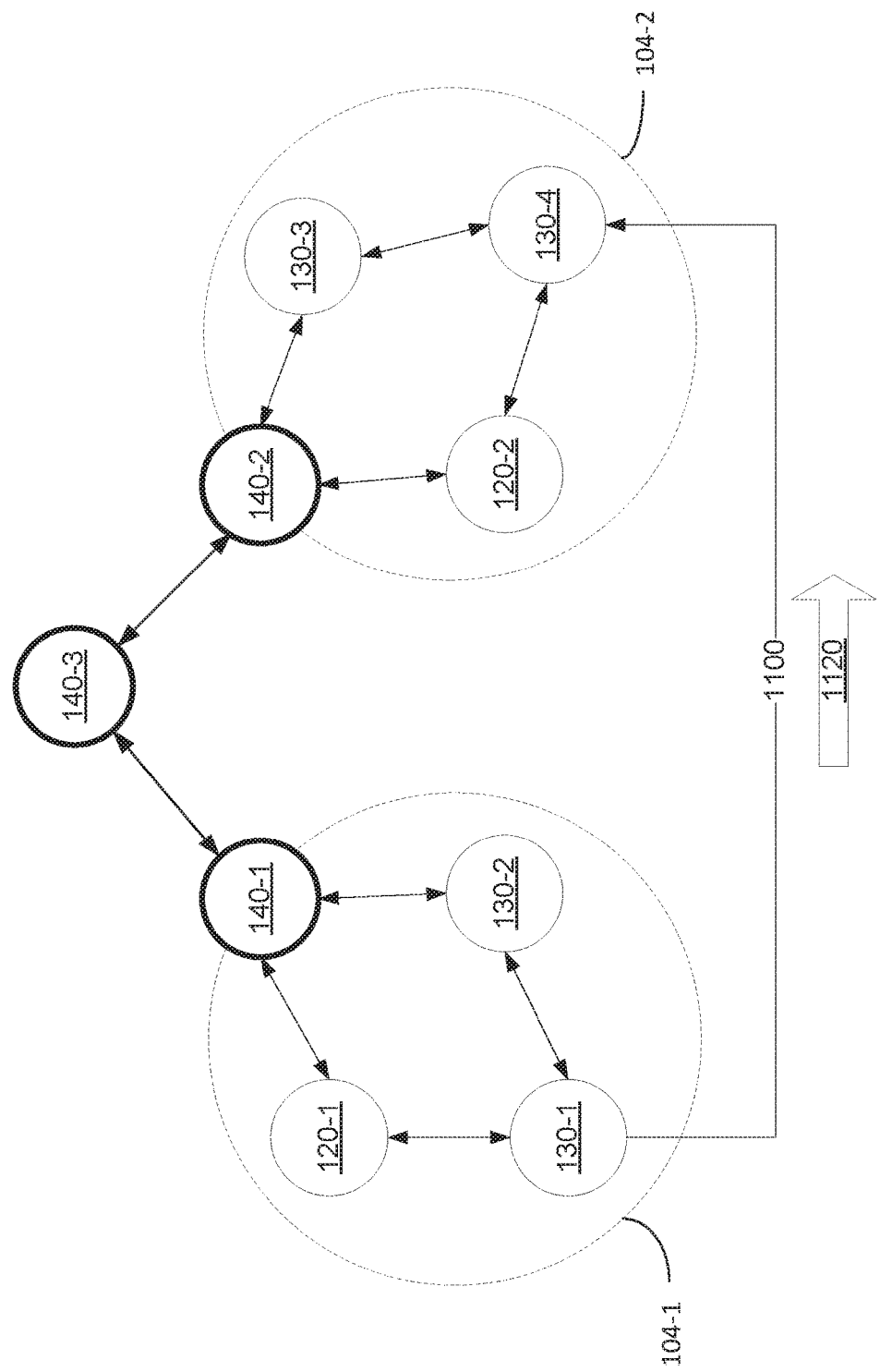

In FIG. 11D, node 130-1 transmits discovery packet 1120 to node 130-4 based on data 1110-2, thereby establishing communication link 1100. In doing so, node 130-1 may rely on at least two different techniques. First, node 130-1 may parse connectivity information from data 1110-2 that reflects the topology of network portion 104-2. Then, node 130-1 may transmit discovery packet 1120 through network portion 104-1 to an access point 150 (not shown here) and then across network portion 104-2 to node 130-4. Alternatively, node 130-1 may parse the MAC address and data rate associated with node 130-4 and target that node directly. Node 130-1 may rely on either such technique based on the distance between nodes 130-1 and 130-4.

Referring generally to FIGS. 11A-11C, these figures illustrate one exemplary scenario where network management nodes 140 may couple together previously disjoint network portions 104. In some embodiments, the functionality of node 140-3 may be performed by either of nodes 140-1 and 140-2. In further embodiments, nodes 140-1 and 140-2 may share responsibility for managing network portions 104-1 and 1042. The general approach discussed above is also described in stepwise fashion below in conjunction with FIG. 12.

Figure 12:
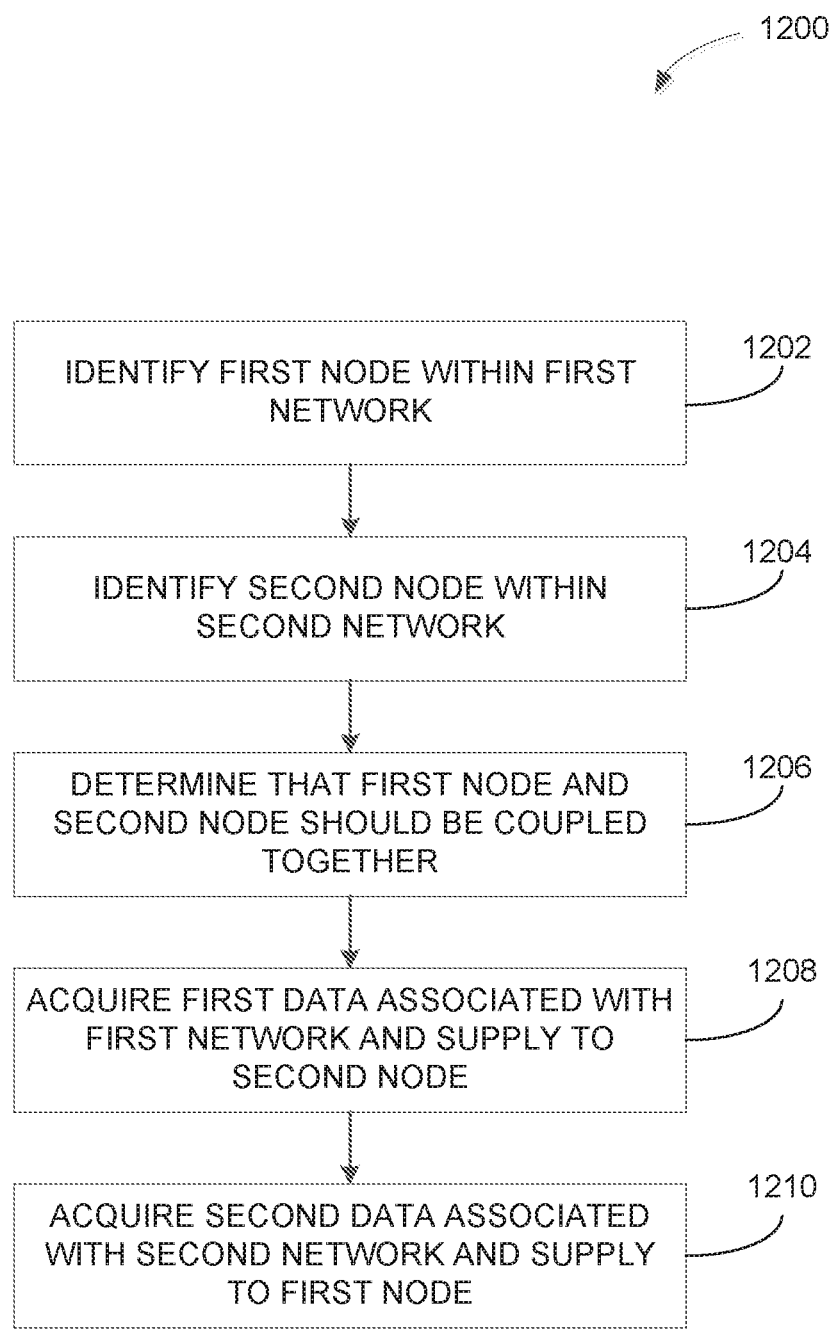
FIG. 12 is a flow diagram of method steps for sharing connectivity information between disjoint network portions in order to form a network system, according to one embodiment of the present invention.

FIG. 12 is a flow diagram of method steps for sharing connectivity information between disjoint network portions in order to form a network system, according to one embodiment of the present invention. Although the method steps are described in conjunction with the systems of FIGS. 1-8 and 10A-11D, persons skilled in the art will understand that any system configured to perform the method steps, in any order, is within the scope of the present invention.

As shown, a method 1200 begins at step 1202, where node 140-3 identifies node 130-1 within network portion 104-1. Node 140-3 may identify node 130-1 based on communicating with node 140-1. At step 1202, node 140-2 identifies node 130-4 within network portion 104-2. Similarly, node 140-3 may identify node 130-4 based on communication with node 140-2. At step 1206, node 140-3 determines that nodes 130-1 and 130-4 should be coupled together. Node 140-3 may make this determination based on node 130-1 requesting to be coupled to node 130-4, or node 130-4 requesting to be coupled to node 130-1, among other possibilities.

At step 1208, node 140-3 acquires data 1110-1 associated with network portion 104-1 and provides that data to node 130-4 via node 140-2. Data 1110-1 may include connectivity information associated with network portion 104-1, as well as the MAC address and data rate of node 130-1. At step 1210, node 140-3 acquires data 1110-2 associated with network portion 104-2 and provides that data to node 130-1 via node 140-1. Data 1110-2 may include connectivity information associated with network portion 104-2, as well as the MAC address and data rate of node 130-4.

Based on data 1110, nodes 130-1 and 130-4 may then establish communication link 1100 with one another. Nodes 130-1 and 130-4 may communicate directly, via targeted transmissions, or indirectly by traversing network portions 104-1 and 104-2. By implementing this approach, a given network management node 140, configured to manage one or more network portions 104, is capable of coupling nodes within those network portions to other nodes within other network portions 104.

In sum, a wireless mesh network includes heterogeneous types of nodes, including continuously-powered nodes and battery-powered nodes. The battery-powered nodes may reside in a sleeping state most of the time to conserve power. The various nodes in the network may communicate with one another by transmitting and receiving at scheduled times and on scheduled frequencies. The battery-powered nodes may become active during the scheduled transmit and receive times. Network management nodes may facilitate network formation by transmitting information that reflects the scheduled transmit and receive times across the network. Based on this data, the continuously-powered nodes and battery-powered nodes may establish communication links with one another.

At least one advantage of the techniques described herein is that heterogeneous types of nodes, such as continuously-powered nodes and battery-powered nodes, may reside within the same wireless mesh network. Accordingly, networks such as the "Internet of Things" may continue to grow, despite having a heterogeneous mixture of device types. When each such device implements the homogeneous communication protocol described herein, those devices may establish communication links with one another. In addition, the functionality of the network management nodes permits disjoint network portions to be coupled with one another, further improving the degree to which heterogeneous devices can be connected.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A non-transitory computer readable medium storing instructions that, when executed by a processor, causes the processor to establish a communication link between different network portions to generate a wireless mesh network, by performing the steps of:
   identifying, from outside a first network portion and a second network portion, a first node within the first network portion based on a first communication received from a first management node in the first network portion that specifies the first node;
   identifying, from outside the first network portion and the second network portion, a second node within the second network portion based on a second communication received from a second management node in the second network portion that specifies the second node, wherein the first network portion and the second network portion include separate and distinct nodes;
   determining that the first node and the second node should be communicatively coupled;
   obtaining, from the first management node in the first network portion, first network data that is associated with the first network portion and includes connectivity information related to the nodes included in the first network portion, wherein the connectivity information comprises a receive window provided by the first node to the first management node, and wherein the receive window comprises a window of time when the first node is available to receive communications from nodes in the second network portion; and
   transmitting the first network data to the second node to enable the second node to transmit communications to the first node within the receive window.

2. The non-transitory computer readable medium of claim 1, further comprising the steps of:
   obtaining second network data that is associated with the second network portion and includes connectivity information related to the nodes included in the second network portion; and
   transmitting the second network data to the first node to enable the first node to communicate with the second node based on the second network data.

3. The non-transitory computer readable medium of claim 2, wherein transmitting the second network data to the first node comprises transmitting the second network data during formation of the second network portion.

4. The non-transitory computer readable medium of claim 3, wherein the second network data includes one or more addresses corresponding to one or more neighbor nodes that reside proximate to the second node and are included in the second network portion, and wherein the second node transmits data to the one or more neighbor nodes based on the second network data.

5. The non-transitory computer readable medium of claim 1, further comprising the step of determining that the second node generates data for transmission to the first node prior to transmitting the first network data to the second node.

6. The non-transitory computer readable medium of claim 1, further comprising the step of causing a time-sourcing node within the second network portion to transmit a first time beacon that indicates a time value to the second node.

7. The non-transitory computer readable medium of claim 6, wherein the time-sourcing node comprises a continuously-powered node, and where causing the continuously-powered node to transmit the first time beacon comprises providing the continuously-powered node with an address associated with the second node.

8. The non-transitory computer readable medium of claim 1, further comprising the steps of:
   configuring a first set of continuously-powered nodes included in the first network portion to communicate with a first set of battery-powered nodes included in the first network portion according to a unified communication protocol; and
   configuring a second set of continuously-powered nodes included in the second network portion to communicate with a second set of battery-powered nodes included in the second network portion according to the unified communication protocol.

9. The non-transitory computer readable medium of claim 8, wherein configuring the first set of continuously-powered nodes to communicate with the first set of battery-powered nodes comprises causing the first set of continuously-powered nodes to schedule data transmissions to the first set of battery-powered nodes based on a first set of media access control addresses associated with the first set of battery-powered nodes and based on a current time value.

10. The non-transitory computer readable medium of claim 8, wherein configuring the second set of continuously-powered nodes to communicate with the second set of battery-powered nodes comprises causing the second set of continuously-powered nodes to schedule data transmissions to the second set of battery-powered nodes based on a second set of media access control addresses associated with the second set of battery-powered nodes and based on a current time value.

11. The non-transitory computer readable medium of claim 8, wherein the first network data includes first media access control addresses associated with the nodes included in the first network portion, and wherein the second node, upon receipt of the first network data, schedules data transmissions to the nodes included in the first network portion based on the first media access control addresses and based on a current time value.

12. A system for coupling together different network portions to generate a wireless mesh network, comprising:
   a primary network management node, including:
      a memory that includes a network management application, and
      a processor that, in conjunction with executing the network management application, performs the steps of:
         identifying, from outside a first network portion and a second network portion, a first node within the first network portion based on a first communication received from a first management node in the first network portion that specifies the first node;
         identifying, from outside the first network portion and the second network portion, a second node within the second network portion based on a second communication received from a second management node in the second network portion that specifies the second node, wherein the first network portion and the second network portion include separate and distinct nodes;

determining that the first node and the second node should be communicatively coupled, obtaining, based on the request and from a node in the first network portion, first network data that is associated with the first network portion and includes connectivity information related to the nodes included in the first network portion, wherein the connectivity information comprises a receive window provided by the first node to the node, and wherein the receive window comprises a window of time when the first node is available to receive communications from nodes in the second network portion, and transmitting the first network data to the second node to enable the second node to transmit communications to the first node within the receive window.

13. The system of claim 12 wherein the first processor, in conjunction with executing the first network management application, configures a first set of continuously-powered nodes included in the first network portion to communicate with a first set of battery-powered nodes included in the first network portion according to a unified communication protocol by causing the first set of continuously-powered nodes to schedule data transmissions to the first set of battery-powered nodes based on a first set of media access control addresses associated with the first set of battery-powered nodes and based on a current time value.

14. The system of claim 13, wherein the first set of battery-powered nodes and the second set of battery-powered nodes reside in a sleeping state for a fraction of time that exceeds a fraction of time that the first set of continuously-powered nodes and the second set of continuously-powered nodes reside in the sleeping state.

15. The system of claim 12, wherein the processor, in conjunction with executing the network management application, performs the additional steps of:

obtaining second network data that is associated with the second network portion and includes connectivity information related to the nodes included in the second network portion; and transmitting the second network data to the first node to enable the first node to communicate with the second node based on the second network data.

16. The system of claim 15, wherein the second management node includes:

a second memory that includes a second network management application, and a second processor that, in conjunction with executing the second network management application, transmits the second network data to the primary network management node.

17. The system of claim 16, wherein the second processor, in conjunction with executing the second network management application, configures a second set of continuously-powered nodes included in the second network portion to communicate with a second set of battery-powered nodes included in the second network portion according to a unified communication protocol by causing the second set of continuously-powered nodes to schedule data transmissions to the second set of battery-powered nodes based on a second set of media access control addresses associated with the second set of battery-powered nodes and based on a current time value.

18. A computer-implemented method for establishing a communication link between different network portions to generate a wireless mesh network, the method comprising:

identifying, from outside a first network portion and a second network portion, a first node within the first network portion based on a first communication received from a first management node in the first network portion that specifies the first node;

identifying, from outside the first network portion and the second network portion, a second node within the second network portion based on a second communication received from a second management node in the second network portion that specifies the second node, wherein the first network portion and the second network portion include separate and distinct nodes;

determining that the first node and the second node should be communicatively coupled;

obtaining, from the first management node in the first network portion, first network data that is associated with the first network portion and includes connectivity information related to the nodes included in the first network portion, wherein the connectivity information comprises a receive window provided by the first node to the first management node, and wherein the receive window comprises a window of time when the first node is available to receive communications from nodes in the second network portion; and transmitting the first network data to the second node to enable the second node to transmit communications to the first node within the receive window.

19. The computer-implemented method of claim 18, wherein the first network data includes first media access control addresses associated with the nodes included in the first network portion, and wherein the second node, upon receipt of the first network data, schedules data transmissions to the nodes included in the first network portion based on the first media access control addresses and based on a current time value.

20. The computer-implemented method of claim 19, further comprising:

obtaining second network data that is associated with the second network portion and includes connectivity information related to the nodes included in the second network portion; and transmitting the second network data to the first node to enable the first node to communicate with the second node based on the second network data.

21. The computer-implemented method of claim 20, wherein the second network data includes first media access control addresses associated with the nodes included in the second network portion, and wherein the first node, upon receipt of the second network data, schedules data transmissions to the nodes included in the second network portion based on the second media access control addresses and based on a current time value.

* * * * *